July 9, 1940.  R. P. RENTZELL  2,207,177
MACHINE FOR GENERATING POWER TRANSMITTING SURFACES AND METHOD
Filed Dec. 1, 1938  12 Sheets-Sheet 2
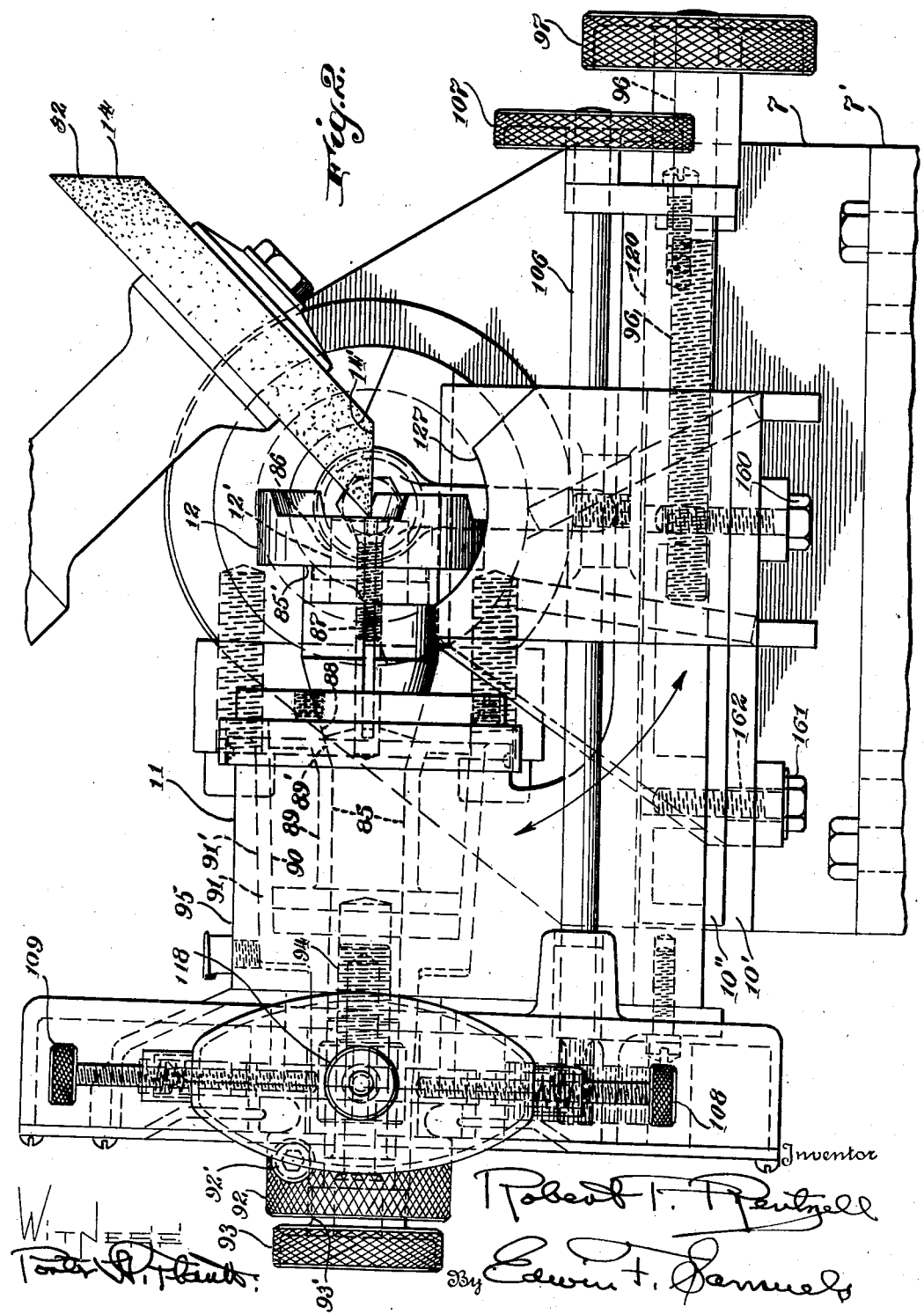

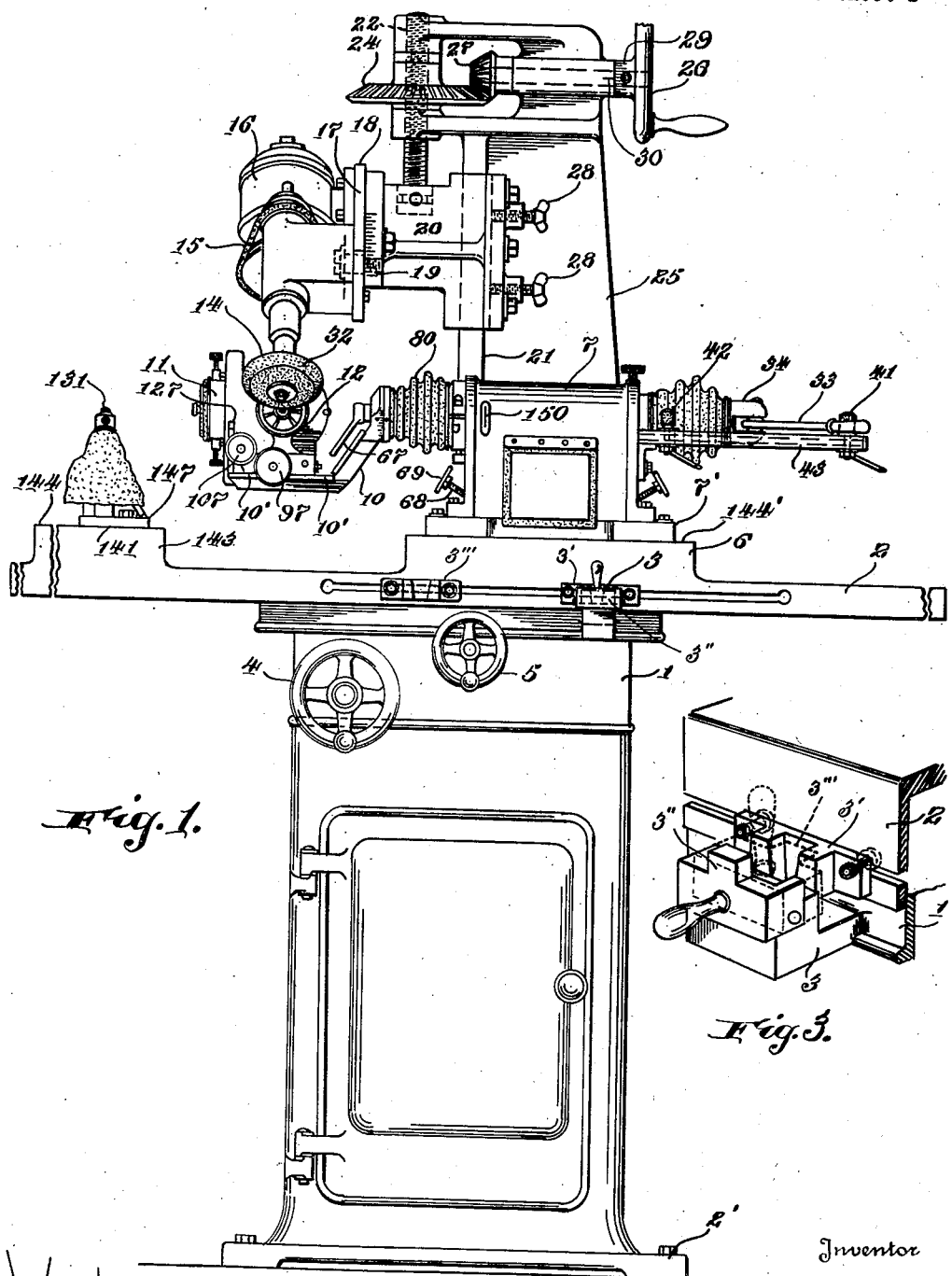

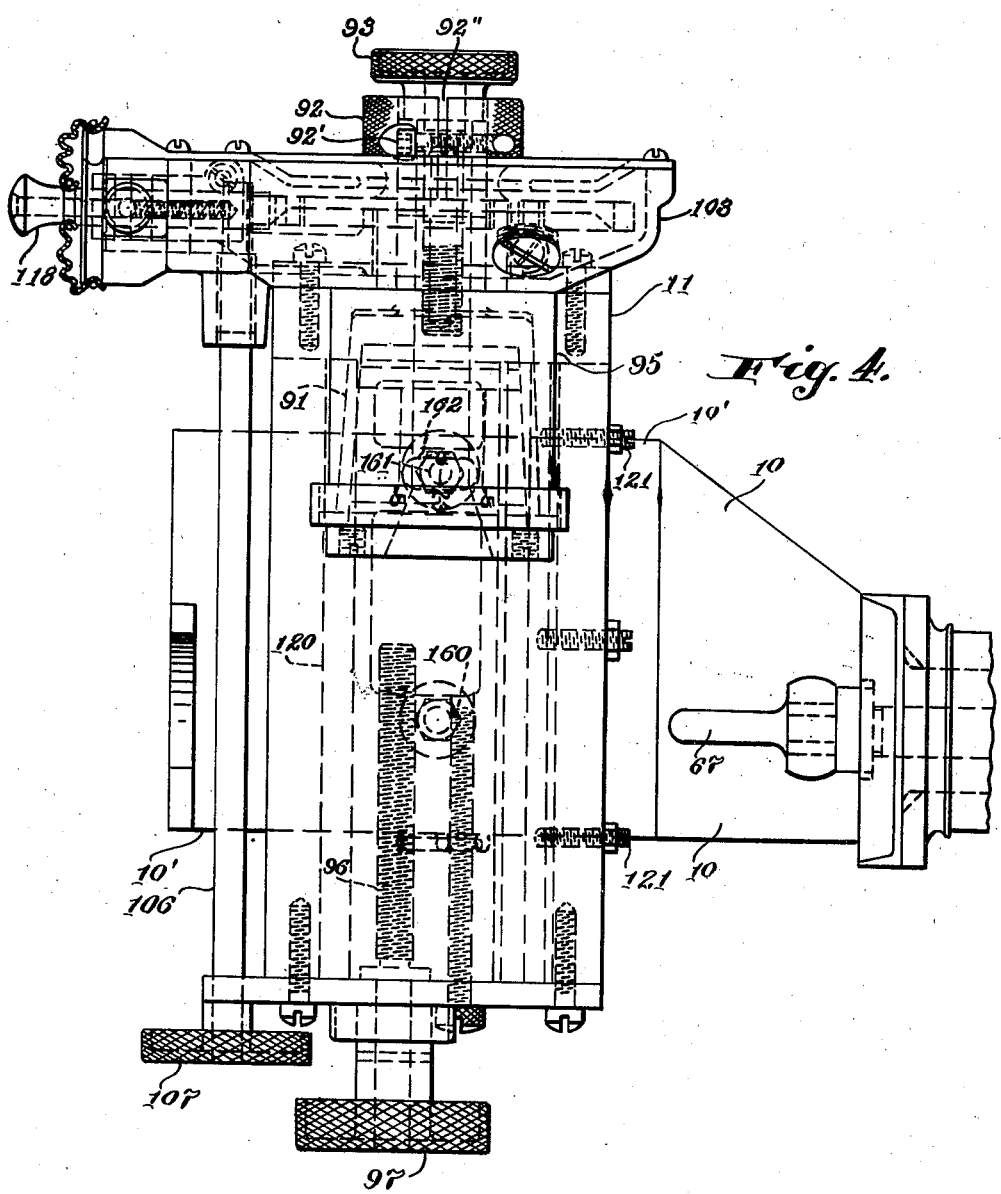

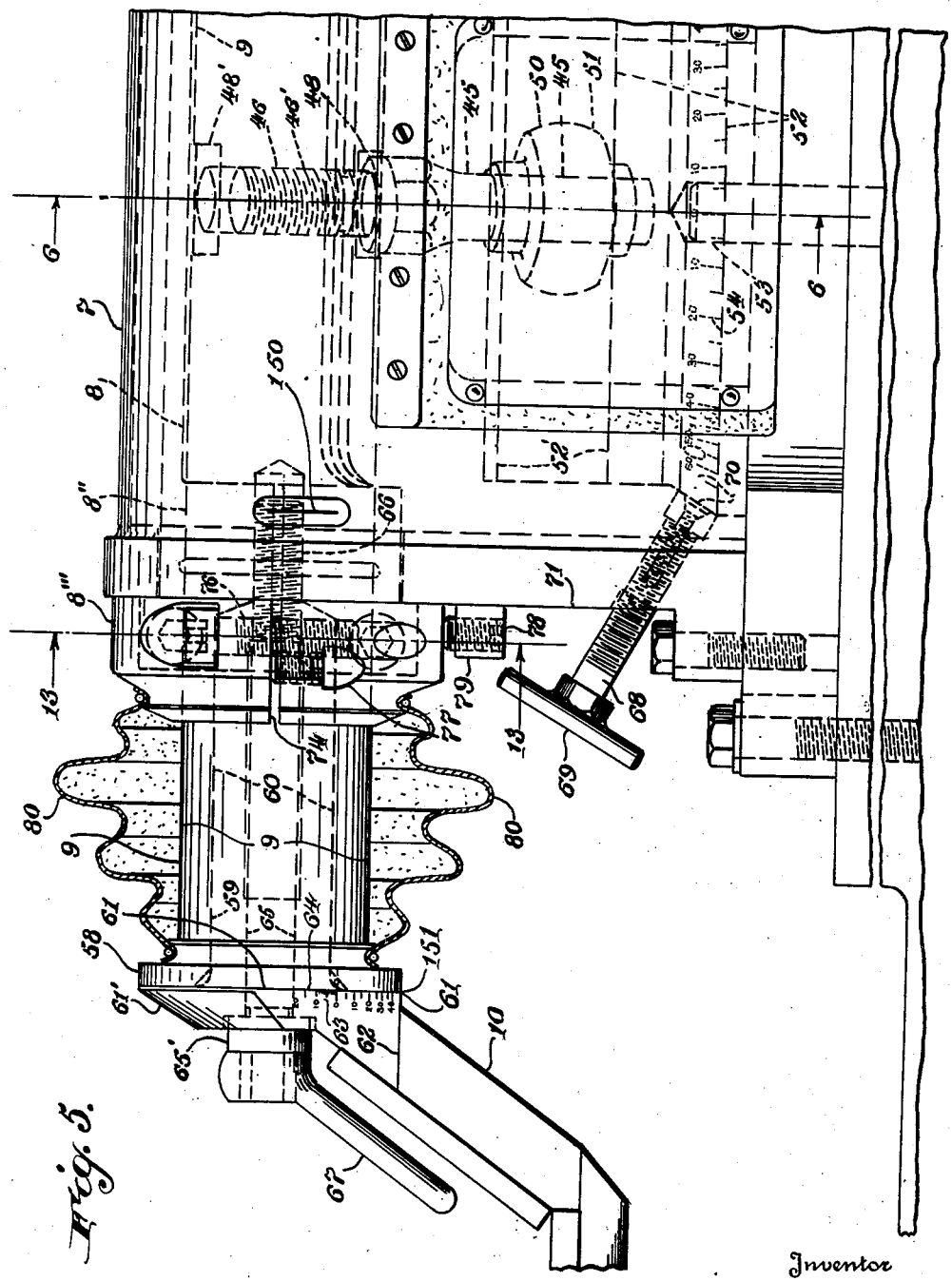

July 9, 1940.    R. P. RENTZELL    2,207,177
MACHINE FOR GENERATING POWER TRANSMITTING SURFACES AND METHOD
Filed Dec. 1, 1938    12 Sheets-Sheet 5

Inventor
Robert P. Rentzell
By Edwin F. Samuels
Attorney

Witness

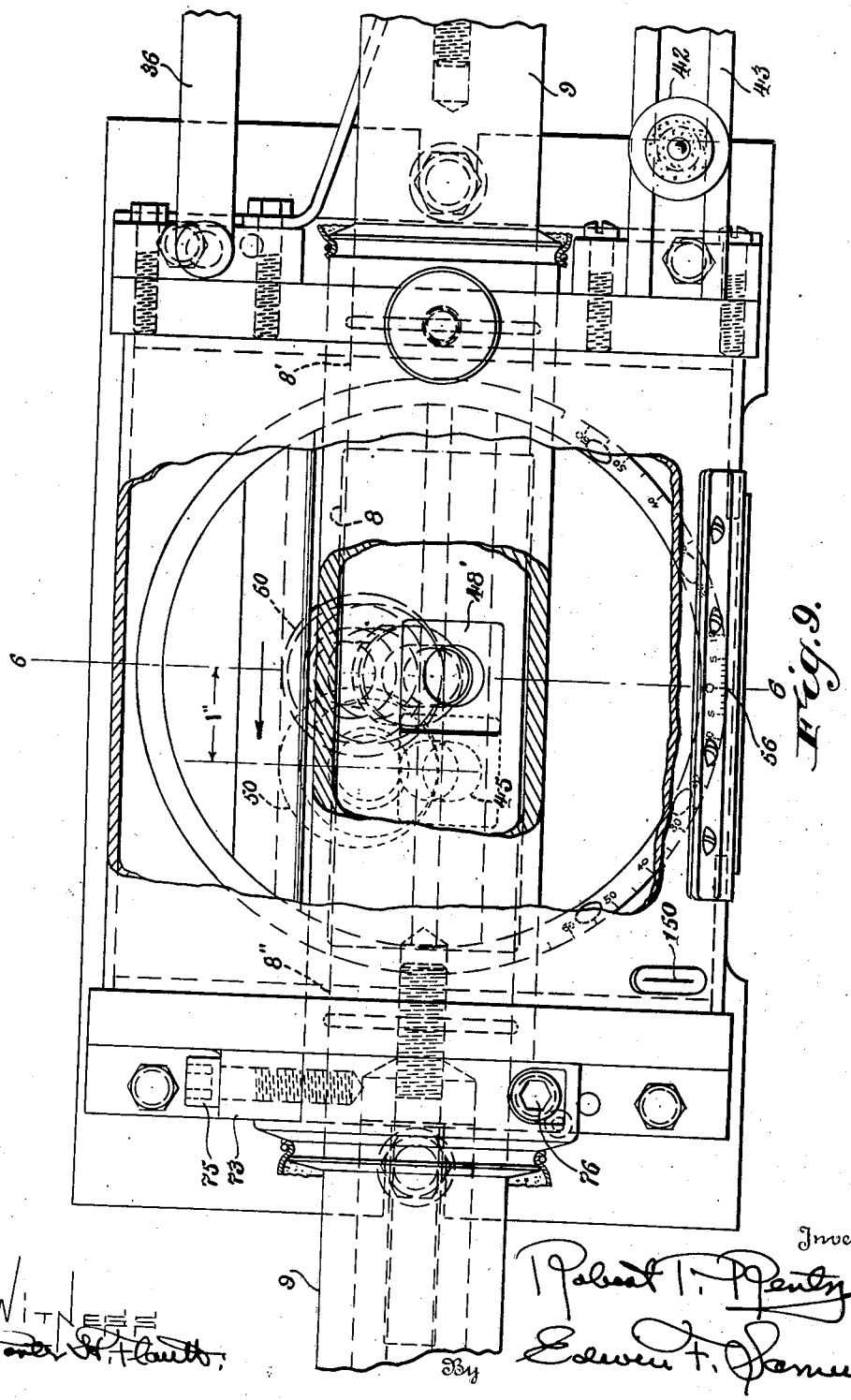

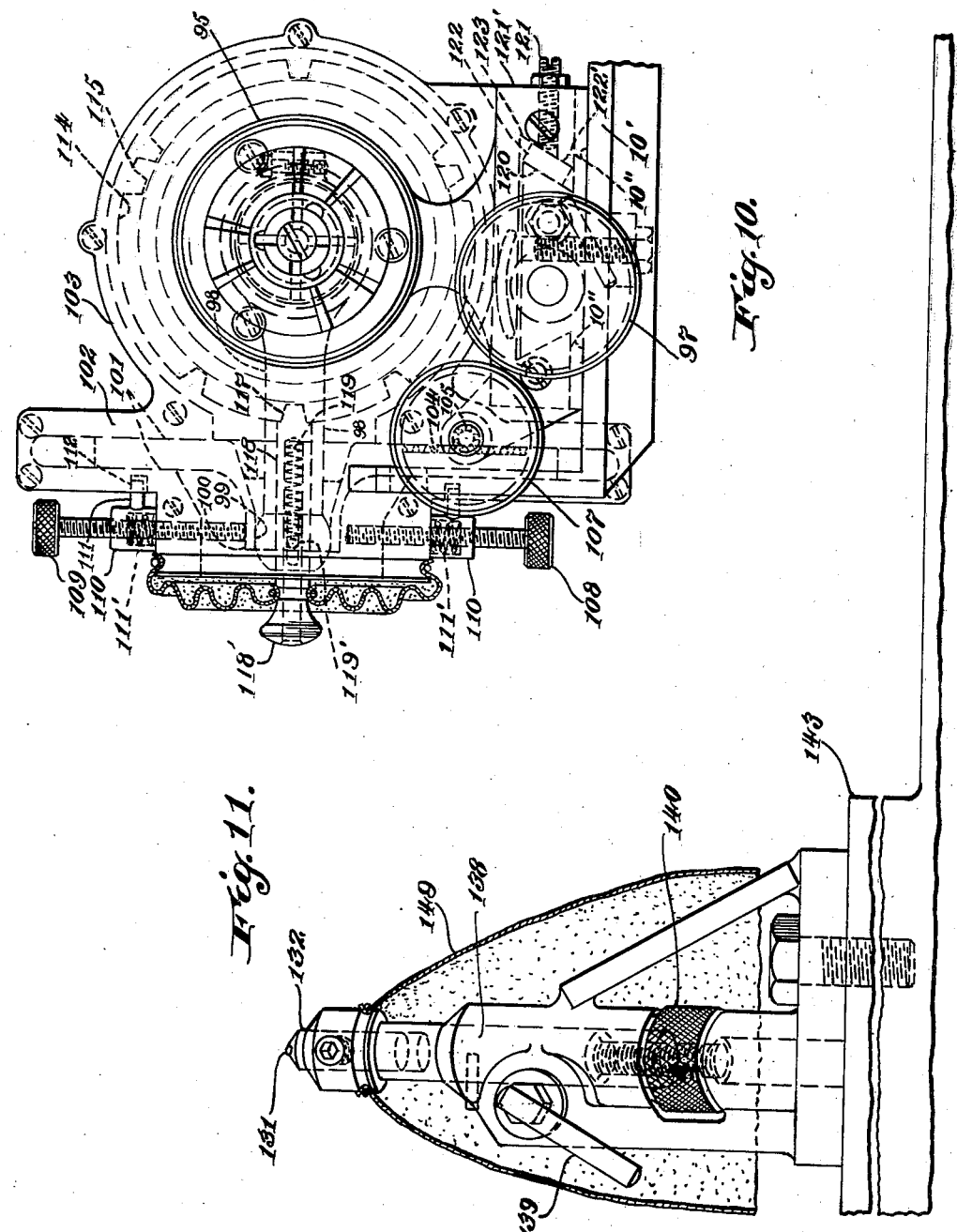

July 9, 1940.  R. P. RENTZELL  2,207,177
MACHINE FOR GENERATING POWER TRANSMITTING SURFACES AND METHOD
Filed Dec. 1, 1938  12 Sheets-Sheet 8
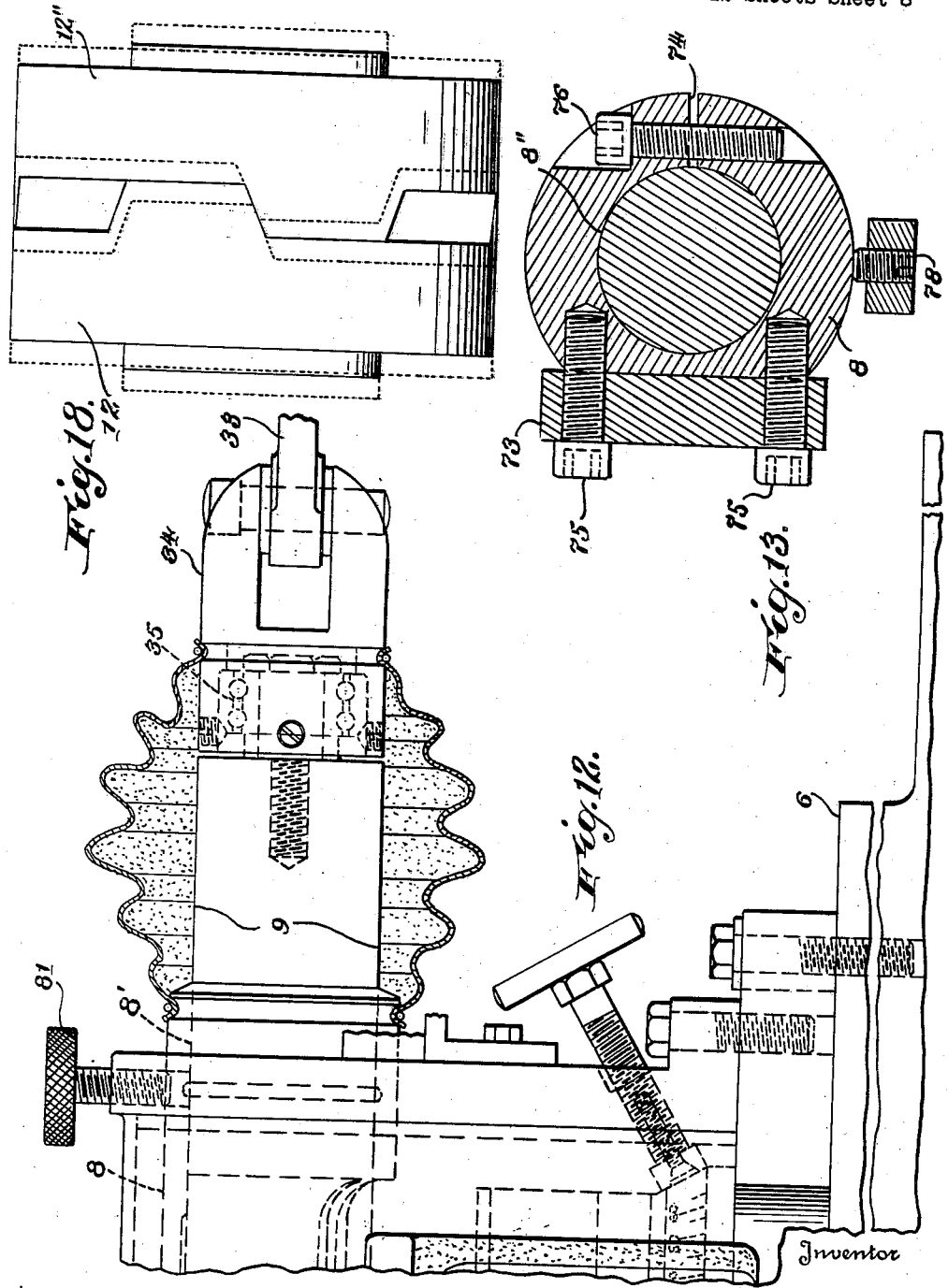

July 9, 1940.   R. P. RENTZELL   2,207,177
MACHINE FOR GENERATING POWER TRANSMITTING SURFACES AND METHOD
Filed Dec. 1, 1938   12 Sheets-Sheet 9

Inventor
Robert P. Rentzell
By Edwin F. Samuels
Attorney

July 9, 1940.  R. P. RENTZELL  2,207,177
MACHINE FOR GENERATING POWER TRANSMITTING SURFACES AND METHOD
Filed Dec. 1, 1938  12 Sheets-Sheet 11
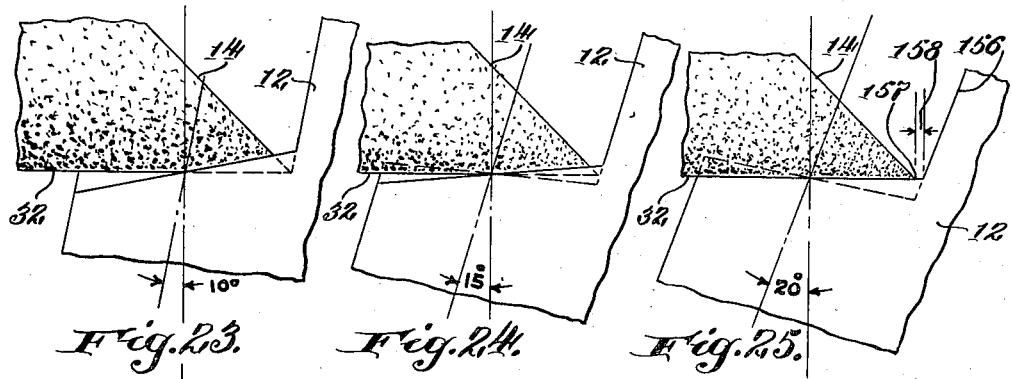
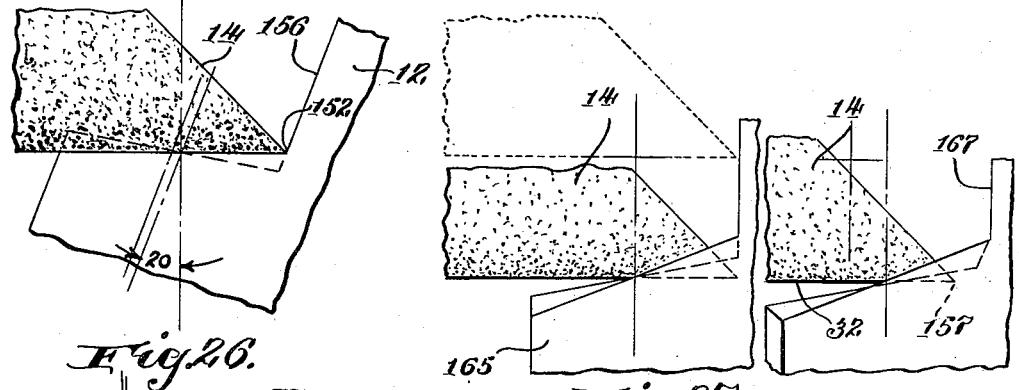
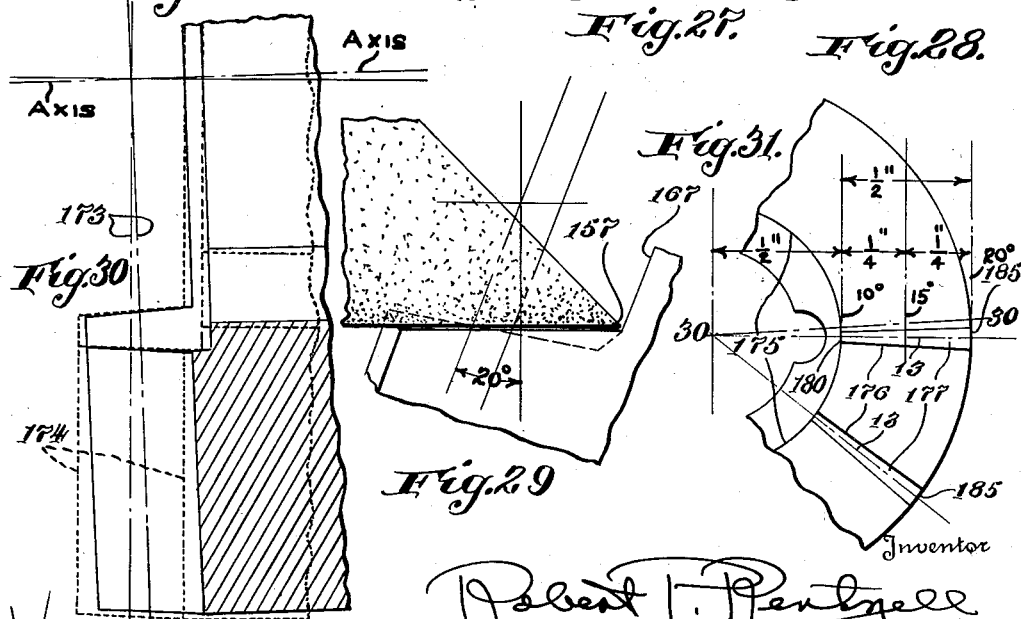

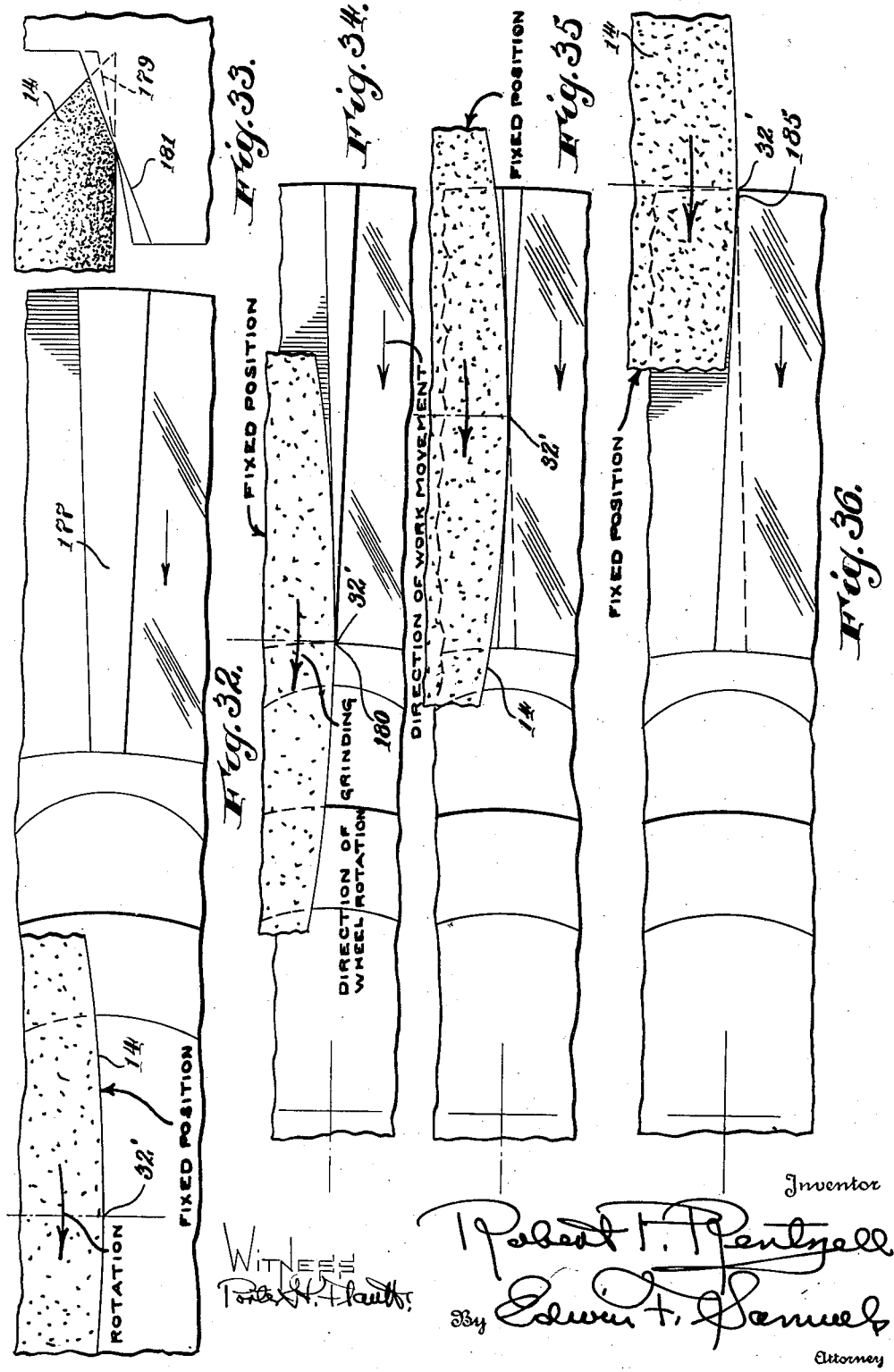

Patented July 9, 1940

2,207,177

UNITED STATES PATENT OFFICE 2,207,177

MACHINE FOR GENERATING POWER TRANSMITTING SURFACES AND METHOD

Robert P. Rentzell, Lutherville, Md., assignor to The Black & Decker Manufacturing Company, a corporation of Maryland Application December 1, 1938, Serial No. 243,375

26 Claims. (Cl. 51—94)

The invention relates to the formation or generation of the tooth surfaces, or the power transmitting surfaces of power driven hand tool clutches of the type in which the clutch members engage and release by relative motion in the direction of the clutch axis, the object being to generate these surfaces in such form as to maintain contact of the tooth surfaces of the respective clutch members throughout the overlapping area of the tooth surfaces, or at least throughout the radial length of the teeth up to the instant of release. To this end the tooth surfaces of one or both clutch members are of helical or substantially helical arrangement either about the axis of the clutch or about an axis close to and substantially parallel to the clutch axis. Where the tooth surfaces of both clutch members are radial about the axis of the clutch, the tooth surfaces, or power transmitting surfaces, are in contact throughout their overlapping area up to the point of release. Where one clutch member has its power transmitting surfaces helical about an axis close to and parallel to the clutch axis, and the other member has a tooth of the transverse pin or similar type, the clutch teeth if designed to cooperate in the manner hereinafter described, will have a full line contact throughout the radial length of the teeth up to the point of release. Both types of clutch are fully disclosed in a co-pending application of Glenn H. Wilhide, Number 156,700, filed July 3, 1937.

While it is possible to produce such clutch teeth by means of a special cutter, this requires a different cutter for each size of tooth, and the difficulty encountered from distortion in the heat treatment which is necessary to production of the tooth surfaces by cutting, and the many cutters which would be necessary to generate all of the clutch teeth of the various sizes, and the time required to generate teeth in this way are all factors which together made the cutting method relatively inefficient, and therefore undesirable. The present invention relates to a machine for generating or forming the helical surfaces of the clutch teeth by grinding, the grinding method also being a feature of the invention, and the machine shown being usable for grinding other helical and other tooth surfaces.

It is of interest that this machine was developed in connection with the production of portable power-driven tools of the overload release type, particularly nut runners, bolt driving machines, and screw drivers. All of these machines are equipped with a jaw clutch which drives one rotating jaw from the other, both being on the same axis, and the clutch is released by the motion of one or both members in the direction of the axis, separating the clutch members, and particularly, the teeth or power transmitting surfaces thereof.

In accordance with the grinding method of the invention, the clutch blank is placed on a spindle or arbor, the clutch teeth being formed in a preliminary way, either by grinding, or by machining. The spindle on which the blank is mounted is concentric with the clutch axis, and is, in turn, mounted upon presenting mechanism secured to a shaft which is at right angles to the spindle, the blank being so presented that the central radial line of the power transmitting surface of the clutch blank being treated, is on the center line or axis of the latter shaft. Means is also provided for rocking the said shaft through a uniform angle about its axis and at the same time moving it in the direction of its axis, and this motion serves to pass the power transmitting surface of the clutch, or clutch tooth "over" a rotating grinding wheel which has its cutting surface arranged with the contact line or element thereof which engages and forms the tooth or power transmitting surface in radial relation to the sliding or substantial shaft. The word "over" as used in this connection in the specification and claims has reference to the passing of the tooth and wheel, one relatively to the other in grinding relation, rather than to the relation of the wheel and tooth, in that one is above or below the other, which latter relation is immaterial. In this way the power transmitting surface which is being formed on the clutch member is drawn in contact with and over the rotating grinding wheel, which is rotated about an axis at right angles to the clutch axis thus generating a power transmitting surface which is helical about the axis of the clutch, or if desired, about an axis parallel to or substantially parallel to the clutch axis and spaced away from the said clutch axis depending upon design of the cooperating clutch members and their arrangement in the final assembly of the clutch.

A machine embodying the features of the invention in the preferred form in so far as it relates to the apparatus, said machine being adapted to generate or grind the power transmitting surfaces of the clutch members above identified, and to be thus used in the performance of the method of the invention is described in the following specification, and illustrated in the drawings.

In the drawings:

Figure 1 is a front elevation of the machine looking from the position of the operator, and showing the blank arranged for generating or grinding the power transmitting surfaces which engage in right handed rotation of the clutch.

Figure 2 is an elevation looking from the left in Figure 1 at the grinding wheel and clutch unit presenting mechanism.

Figure 3 is a clamp for holding the table in the clutch tooth generating position of the machine.

Figure 4 is a top plan view of the clutch unit holding and presenting mechanism at the outer end of the swinging arm beneath the grinding wheel.

Figure 5 is fragmentary front elevation of the inner end of the swinging arm and the operating mechanism for the same.

Figure 9 is a top plan view of the construction shown in Figures 5, 6, and 8, the casing being broken away to show the inner construction and the bearing tube likewise being broken away to show the underlying portion of the mechanism.

Figure 10 is an elevation looking from the front at the blank presenting mechanism beneath the grinding wheel showing a blank thereon.

Figure 11 is an elevation of the grinding wheel trueing diamond and support together with a fragment of the machine table.

Figure 12 is an elevation continuous with Figure 5 showing the portion of the casing and parts enclosed therein immediately at the right of Figure 5, the operating lever for moving the blank as hereinafter described being broken away.

Figure 13 is a section on the line 13—13 in Figure 5 showing the sliding rotation bearing for the shaft for supporting and operating the swinging arm which carries the blank presenting mechanism.

Figures 16, 17:
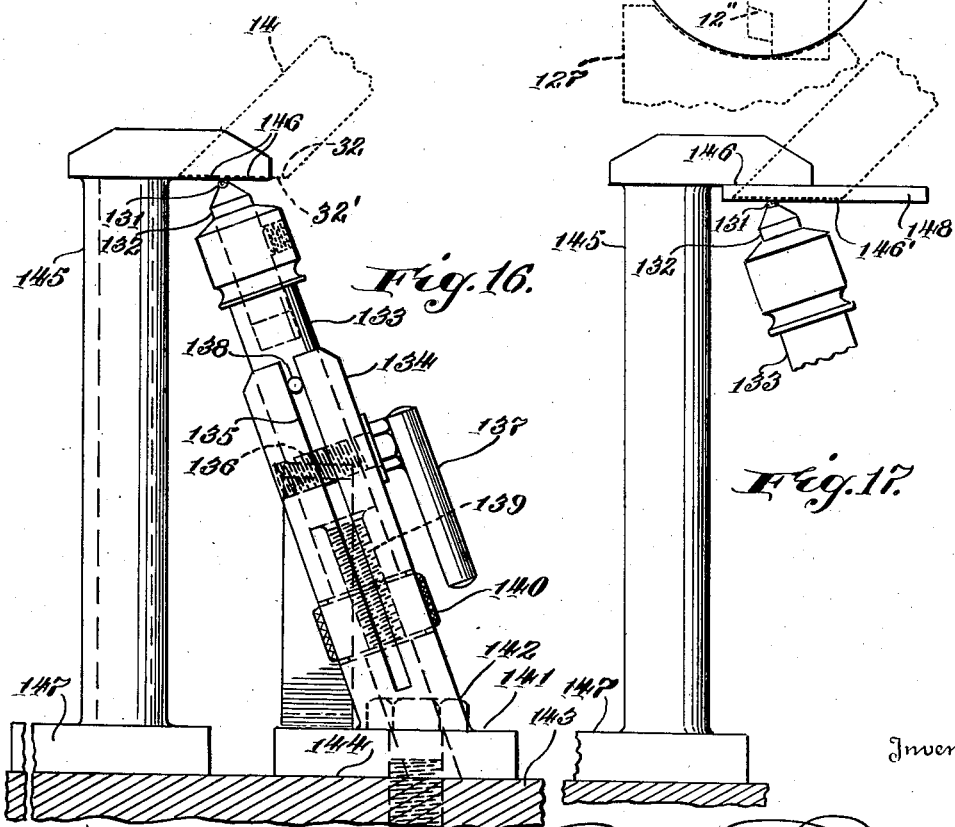

Figure 16 is an elevation of the grinding wheel trueing diamond and support taken from the left in Figure 11, a gauge for setting the diamond also being shown in operative relation thereto, and Figure 17 is a fragmentary view showing the gauge with a spacing plate in operative relation thereto and the diamond in operative position for trueing the wheel for generating teeth for cooperation with a pin in the pin type of clutch.

Figure 18 shows two clutch members of the helical surface type generated by this machine, the clutch members being in operative relation, and the helix being of the radial type, the two clutch members being similar, and the view being enlarged.

Figure 19:
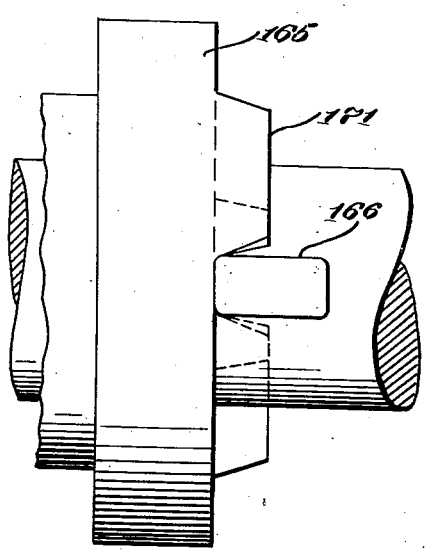

Figure 19 shows a clutch, one member of which is a transverse pin, the other member being a helical tooth surface generated about an axis which is offset about half of the thickness of the pin from the axis of the clutch.

Figure 20:
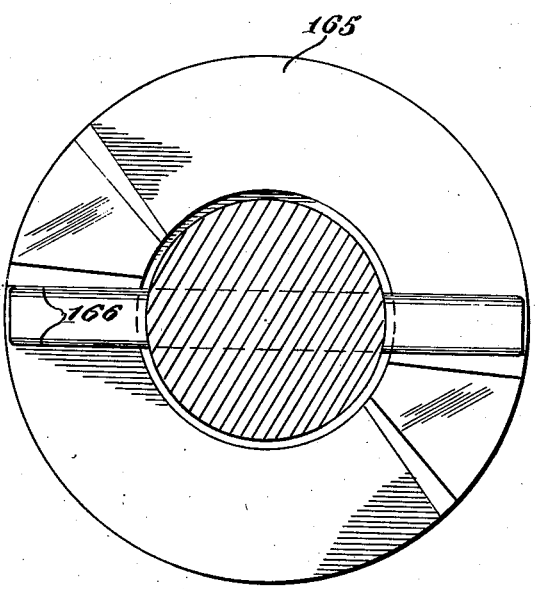

Figure 20 is a view looking at the clutch of Figure 19 from the right in said figure.

Figure 21:
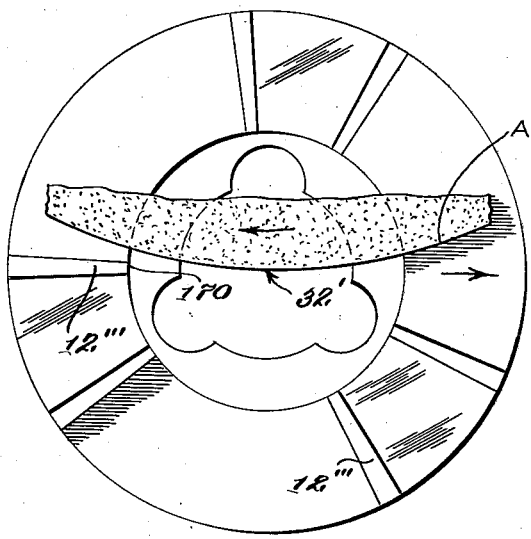

Figure 21 is a front elevation, i. e. looking from the same point of view as Figure 1 showing a clutch blank of the radial helix type, the blank being in a position in which its axis is in the same vertical plane as the axis of the grinding wheel which is the position for setting the machine prior to cutting, the arrangement shown is for generating or grinding the back surface used only in left handed rotation of the clutch.

Figure 22:
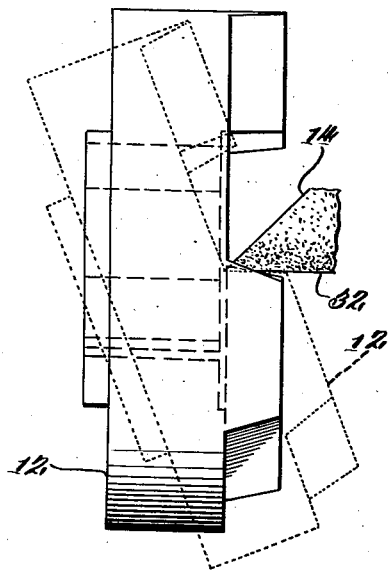

Figure 22 is a left side elevation of this same subject matter and arrangement, the clutch blank also being shown in broken lines in the position to which it is tipped at the end of the cut in cutting the 15° angle tooth particularly described in this specification.

Figures 23, 24, and 25 show fragmentarily and enlarged, the relative positions of the grinding wheel and blank as the blank is rocked ten degrees, fifteen degrees, and twenty degrees respectively from the initial position corresponding to Figure 1 in the cutting operation as hereinafter described, the generating or grinding operation being applied to the surface which engages in right handed rotation and the blank being moved radially as it is rocked.

Figure 26 is a view closely similar to Figure 25 but showing the position of the grinding wheel in relation to the blank after the work holder has been swung to compensate for the movement of the blank away from the wheel as shown in Figure 25.

Figure 27 is a view showing the relation of blank and wheel for grinding the surface of the tooth which engages in right hand rotation of the clutch, the broken lines indicating the position of the grinding wheel prior to dropping it for grinding the offset tooth for use with the pin type of clutch member, the full line position of the wheel being that in which the axis of the clutch is in the vertical plane of the wheel axis, this being the position for setting the machine and corresponding except as stated, to the full line position, Figures 21 and 22.

Figure 28 shows the blank moved away from the wheel from the position, Figure 27, to compensate for the rotation of the blank which, with the wheel lowered as described so that its cutting plane is below the axis of the wheel, tends to cause the grinding wheel to cut into the base of the tooth.

Figure 29 shows the wheel and clutch member of the type shown in Figures 27 and 28, the clutch blank being in relation to the wheel which these members occupy at the end of the cutting stroke, the blank being rotated through an arc of 20°.

Figure 30 is a fragmentary sectional view of one-half a blank of the offset type, the blank having been rotated from its initial position in Figure 27 as to the position, Figure 29, and the axis and the center line of the tooth surface being shown in both positions. This may be treated as a section on line 30—30 in Fig. 31.

Figure 31 is a fragmentary plan of a clutch member of the radial helical surface type looking in the direction of the axis showing the dimensions of the standard clutch unit produced in this way.

Figure 32 is a fragmentary front view corresponding to Figure 1 on an enlarged scale of the grinding wheel and the tooth about to be cut in the initial position of setting the machine in which the axis of the clutch blank is in the vertical plane of the axis of the wheel.

Figure 33 is a view looking at the subject matter of Figure 32 from the right.

Figure 34 is a view similar to Figure 32, the blank having been moved to the left to bring the inner edge of the tooth into cutting plane and turned about a transverse axis through an angle of 10° which is the initial position of the blank in the actual grinding operation.

Figure 35 is a similar view showing the blank moved to a position in which the cutting plane of the grinding wheel is in the center of the tooth surface measured radially, the blank having been rotated through an angle of 15°, the angle of the tooth of the center in the example shown being 15° divergent from the clutch axis.

Figure 36 is a similar view showing the end of the grinding operation, the blank having been rotated through an angle of 20°, and the outer edge of the tooth in a radial direction being in the cutting plane of the grinding wheel, so that its outer edge as ground is 20° to the axis.

The operation considered in a general way, having particular reference to Figure 1, consists in moving the blank transversely through the cutting plane of the grinding wheel, and in cutting relation to the same as the wheel rotates, the blank moving in the direction of its radius and at the same time being rocked or tipped about said radius which constitutes an axis transverse to the axis about which the clutch member rotates in its operation when installed in a power driven tool or similar apparatus for which the clutch members generated in this way are provided. In one operation illustrated, the axis about which the blank is rocked during the grinding or generation of each tooth surface is radially disposed as to the blank, and located in, or substantially in, the generated or ground surface, and about half way between the base and the peak of the tooth. The generated surface if extended to the center of the clutch, would in the radial type, coincide or tend to coincide with the clutch axis and in non radial type which is shown as cooperating with a pin clutch member, said surface if extended inwardly, would tend to coincide with a line substantially parallel to the clutch axis and spaced therefrom in correspondence with the offset of the pin surfaces which engage the generated tooth surfaces. It is therefore found expedient in generating radial helical surfaces to use an initial position, one in which the grinding element or line of the wheel coincides with the clutch axis which, in this machine, brings the axis of the blank into the vertical plane of the wheel axis. From this position the blank is moved in the direction of, and rocked about or substantially about its radius located intermediately of the generated tooth surface.

In cutting the clutch member which cooperates with a pin forming the pin type of clutch, the grinding wheel is moved downwardly by a distance which equals or closely corresponds to half the thickness of the pin measured in the direction of the radius which causes some variation in the operation as hereinafter more fully described.

In cutting the fifteen degree teeth described, the blank rocks about the transverse axis just identified through an arc of 20°, the inner end of the tooth surface towards the axis being at an angle to the axis of 10°, the center of the tooth being at an angle of 15°, and the outer edge of the tooth being at an angle to the axis of 20°. This angle can be varied as desired. The angles and dimensions given apply to a clutch blank which is two inches in outside diameter, and has a central hole for the shaft or the like, one inch in diameter which makes the tooth of the radial length of one-half inch. This is merely a standard size of clutch made by the assignee on the machine illustrated. It is for example only and has no direct bearing on the patentable features of the invention.

Referring to the drawings by numerals each of which is used to indicate the same or similar parts in the different figures, and having particular reference to Figure 1;

The machine as shown comprises a standard 1 with a base 2' which is secured to the floor. Mounted on this standard is a table 2 which in the grinding operation is stationary being secured by a clamp 3 which need not be described in detail except that it serves in combination with the ways to hold the table rigidly in the predetermined position during the grinding or generating operation. For other operations it is released and moved by hand wheels 4 and 5, hence: The machine also includes means controlled by the hand wheel 5, and not shown in detail for moving the table toward and from the operator as shown in Figure 1, means not shown controlled by hand wheel 4 for moving the table in the plane of Figure 1; these motions of the table are not possible or desired when the table is clamped by the clamping member figure number 3, for the grinding operation.

Figure 6:
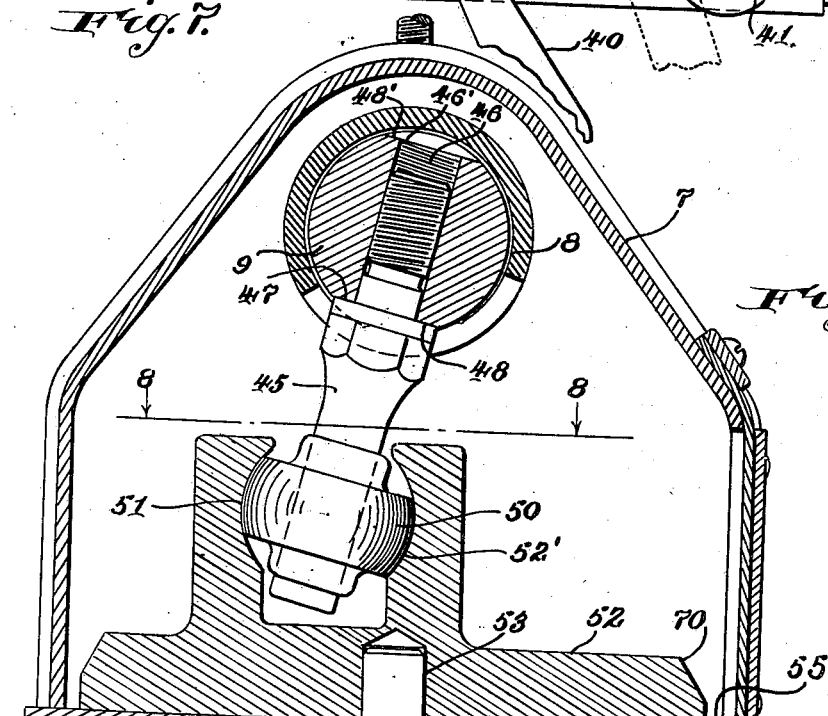
Figure 6 is a section on the line 6—6 in Figure 5, looking toward the right in said figure.

The table 2 is provided with a pedestal 6 on which is mounted a casing or housing 7 which is shown on a larger scale in elevation in Figures 5 and 12, the point of view being the same as in Figure 1, and is also shown in vertical cross-section in Figure 6, and in plan in Figure 9. The housing 7 contains a bearing tube 8 which is elongated in a direction parallel to the plane of Figure 1, and is horizontally disposed. At its ends it is provided with bearings 8' and 8''. The tube 8 encloses the operating shaft 9 which slides and turns in bearings 8' and 8''. The swinging arm 10 on which the work presenting mechanism 11 is mounted is secured to operating shaft 9 as hereinafter described. Figure 1 shows blank 12 being presented to grinding wheel 14 by said mechanism 11 which is located on a moving base 10' integral with arm 10.

The grinding wheel 14 is driven by belt 15, Figure 1, operated by an electric motor 16. As shown, the grinding wheel 14 is carried by a rotary head 17 which also carries the motor 16, the head comprising a base plate 18 and being mounted for adjustment about an axis which is horizontal and parallel to the plane of Figure 1 and to the axis of shaft 9. The plate 18 is marked to cooperate with a vernier 19, or scale on the bracket 20, and the bracket 20 is mounted on vertical ways 21 to move up and down, the bracket being adjusted by means of a vertical screw 22 on which a bevel gear 24 is mounted in driving relation.

The vertical ways 21 and the screw 22 are carried by a stationary upright 25 mounted on the standard 1 back of the casing 7 and table 2 and this upright carries a hand wheel 26 which operates a bevel pinion 27 by which the gear 24 and hence screw 22 are rotated to move the head 17 up and down. The normal adjustment of the grinding wheel surface has already been described.

The bracket or carriage 20 is provided with clamping screws 28, for purposes of fixedly positioning the carriage as to adjusted operating position. The hand wheel 26 may be provided with micrometer markings or graduations as indicated at 29 and a zero marking on the fixed bearing portion of the machine as indicated at 30 for purposes of indicating and determining the vertical position of the grinding wheel carriage and/or the grinding wheel member 14. In the cutting operation in the form of the invention herein disclosed, as illustrative, as already pointed out, the cutting or grinding surface of the wheel indicated by reference character 32, and particularly the bottom element or line of the same at 32' in Figure 21 where grinding takes place is substantially horizontal, and in the initial position for cutting the radial helically surfaced teeth, the axis of the blank is likewise horizontal and in the same line, the blank from this position being rocked and moved in grinding as already suggested. The wheel is offset downwardly as already described when the offset helical surfaces are to be ground or generated to cooperate with the pin in the pin type of clutch. The radial motion of the blank, and the rocking of the blank about the transverse axis already mentioned are accomplished by the swinging arm 10 which is carried by the operating shaft 9 which rocks and slides to give the desired motion of the blank from the above stated initial position which may be actual or theoretical.

Figure 7:
Figure 7 is a fragmentary plan view of the operating lever for presenting the clutch unit blank and the cooperating car parts.

The sliding motion of the shaft is accomplished by means of the swinging lever 33 which is shown in plan in Figure 7. To engage this lever, the operating shaft 9 is provided with a rotary head 34 which is mounted on the end of the shaft by means of ball bearing 35 as shown in Figure 7. The lever is fulcrumed on a support 36 which is provided with two or more fulcrum positions, the fulcrum being indicated reference character 37. Another position of the lever 33 to give a different path of motion of the shaft 9 as in grinding the opposite surfaces of the teeth is shown in dotted line in Figure 7. The fulcrum may be shifted from 37 to 37' for this purpose changing correspondingly the path of shaft 9. The lever 33 is pivotally connected at 38 to and with the rotary head 34 of the shaft 9 and the lever at its end opposite to the fulcrum 37 has a handle 40, the extreme motion of which is controlled by stops 41 and 42 which are adjustably mounted on a suitable support 43 shown in plan in Figure 7 and in elevation in Figure 1. This operating lever or hand lever 33 provides for the radial motion of the blank in grinding, i. e., in a horizontal line parallel to the plane of Figure 1 which is the line of the axis of shaft 9, but these details are merely for illustration, it being conceivable that the angle of the machine may be changed, and/or the motions described varied without loss of all utility, and that the relative motions of the blank and grinding wheel may be otherwise accomplished within the broader scope of the invention.

To rock the shaft 9, and the arm 10 and base 10' which carries the work presenting mechanism 11, the shaft 9 is provided a roller arm 45 which is best shown in Figure 6. This roller arm 45 is engaged with the shaft 9 by means of a screw 46 which is threaded in an axial direction into the shaft 9. The arm 45 has the flat shoulder 47 which bears against a flat left surface 48 on the shaft, this surface is duplicated at 48, 48' at the two ends of the axial threaded hole 46' so that when the shaft becomes worn it can be turned over and the arm 45 inserted from the opposite side. This flat portion 48' is shown in plan in Figure 9 where the bearing tube 8 is broken away.

Figure 8:
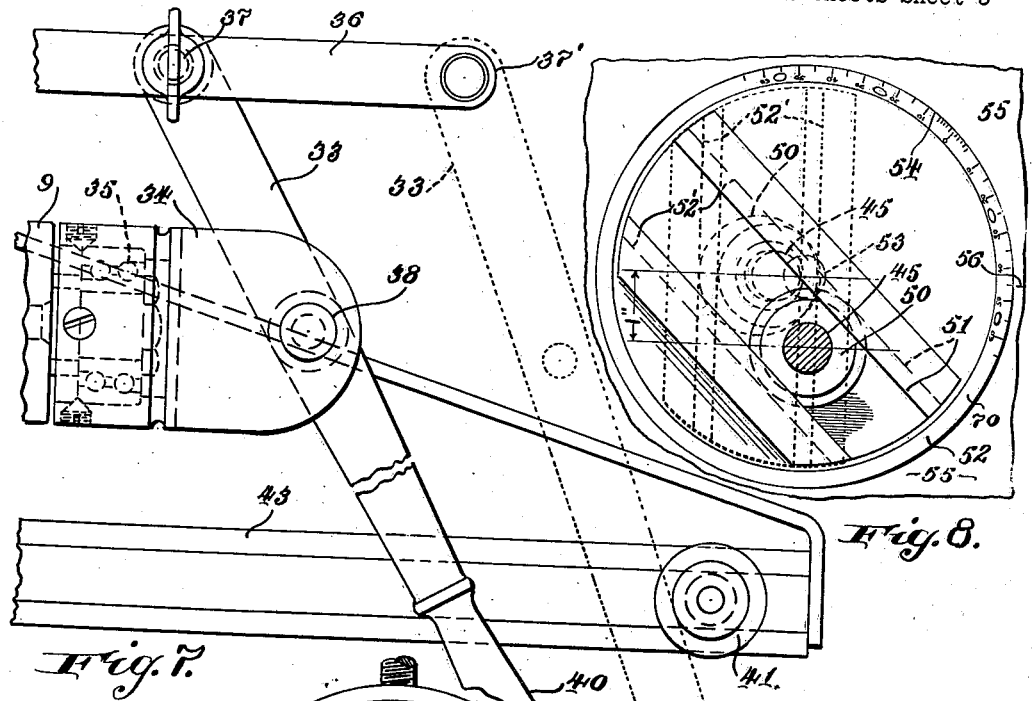
Figure 8 is a plan view of the rotatively adjustable path, or guide plate, the front of the machine being at the right in this figure.

The roller arm 45 carries at its outer end remote from the shaft 9, a spherical roller 50 which slides or rolls in a groove or guide slot 51 of a cross section which corresponds to the shape of the spherical roller 50. This groove is formed in a rotary guide plate 52 which is shown in axial section in Figure 6. The guide plate 52 is mounted to rotate about a pin 53 which as shown in concentric with the plate 52. The groove or guide slot 51 which is shown in plan in Figure 8 is straight and parallel to the diameter of the plate 52. As shown, one side of the slot 52' is practically diametrical. The rocking of the arm 10, and the shaft 9 is controlled by adjustment of the plate 52 about the pin 53 to determine the angle of the guide slot or groove 51. The pin 53 is seated in the base 7' of the casing 7 which is secured to pedestal on table 2.

In the operation of the machine, the angle of the generated or ground surface of the tooth, and the angle of the helix which in the form of tooth shown and described is 15° to the axis at a point half way between the radial inner and outer edges of the tooth surface is determined by the position of the plate 52, the angle of the guide slot or groove 51 to give the type of tooth described, and having particular reference to the surfaces which transmit the power in the right handed rotation of the clutch, the guide slot 51 would be at 45° to a north and south line as seen in the plan, Figure 8, the guide slot 51 extending in a northeasterly and southwesterly direction as seen in said plan, the front of the machine being at the right in said figure which is the direction from which Fig. 8 is to be considered in applying this description. The periphery of the plate 52 is provided with index 54 and the surface 55 on which the disc 52 is supported is provided with a suitable pointer 56 to cooperate with said index or vernier.

It should be noticed that the plate 52 is clamped in its adjusted angular position by means of a screw 68 provided with a hand grip or a cross pin 69 and bearing against the inclined surface of the plate 52 at 70, the screw 68 is threaded into a suitable upright 71 which forms the end of the frame or casing 7.

In the arrangement of the machine and of the disc 52 as illustrated in these figures, the blank moves and swings from a center position with its axis in the vertical plane of the axis of the grinding wheel 14, in which position the axis of the blank is horizontal to a position in which the outer end edge of the tooth is in the vertical plane this position having rocked through an angle of 20° as illustrated in Figures 21 to 25. The relative, and not the actual positions, affect the result.

The swinging or work supporting arm 10 is mounted on the end of the shaft 9 which is at the left in Figures 1 and 5. The end of the shaft 9 is flanged at 58 and it has the central axially aligned circular hole 59. The arm 10 at its right hand end is provided with a stud 60 which is seated in the hole 59 and rotatable therein for purposes of adjustment, the parts being carefully lined by grinding, etc. The arm 10 is further provided with a circular flange 61' having a surface 61 at right angles to the axis of the stud 60 and of the same diameter as the flange 58, and a cylindrical surface of the flange 61 at 62 is provided with an index 63 or a vernier which cooperates with the suitable point 64 on the edge of the flange 58 to determine the angle of the blank and presenting mechanism in the initial position, and the arm 10 is clamped in adjusted position by means of a screw 65 which is coaxial with the stud 60 and the shaft 9 and passes through the stud 60 which is suitably bored and beyond the stud 60 from the left end of the stud 60 to the right and into the shaft 9 having a threaded engagement therewith at 66 in Figure 5. The screw 65 is also provided with an operating handle or a clamping arm 67 shown in Figures 1 and 5 and elsewhere.

Figure 13 which is a section on the line 13—13 in Figure 5 shows in cross section a block or plate 73 which is welded to the rear edge of the upright end 71 of casing 7. An enlarged collar 8''' formed on the end of the bearing 8'' of the shaft 9 just outside casing 7 as shown in cross section in Figure 13 is supported on the block 73 by means of screws 75, and, as shown in Figures 13 and 5, this bearing is split at 74 in the direction of the axis, and this split is adjustably closed or drawn together by a screw 76. Figure 5 also shows a screw 77 seated in the collar on one side of the split, and bearing on the other side of the same, by which the slit 74 may be opened to free the bearing, and Figure 5, and also Figure 13 further show a screw 78 supported in a suitable ear 79 on the frame by which the bearing may be raised as desired to give the desired adjustment and alignment of the bearing and of shaft 9, and to give just the right degree of freedom for turning without play. The portion of the shaft which is exposed outside the bearing at the left in Figure 5 is covered by a chamois bag or other suitable protection 80, and other bearings are similarly protected. It will be understood that when the arm 10, and base 10' are properly adjusted about the shaft 9, the arm 10 is clamped by means of the screw 65 tightened by means of the handle or arm 67. Every precaution is taken to give the machine the desired accuracy. The right hand end of the shaft 9 adjacent bearing 8' as shown in Figure 12 is protected by a similar chamois bag to that shown at 80 and the bearing 8' has a clamping screw 81 to hold the shaft 9 stationary for purposes of adjustment of shaft 10.

The work presenting mechanism 11 shown and briefly discussed in connection with Figure 1 is illustrated in plan in Figure 4, in front elevation in Figure 10, and Figure 2 which is a view looking from the left in Figure 1. Having particular reference to Figure 2, the blank 12 is mounted on the split expanding end 86 of an arbor 85. The split tapered end 86 of said arbor is expanded within the central opening 12' of the blank 12 by means of a screw 87 having a tapered flaring head. The screw 87 is threaded into an opening which is axially located in the arbor. This hole is tapered at its outer end in correspondence with said screw 87. The arbor 85 is shouldered at 85' to position and support the blank 12, and is in turn externally tapered at 88 to fit in a correspondingly tapered hole 89' in a plug carrier 89 which fits in a tapered hole 90 in a tapered presenting member 91 which is mounted in tapered bearing 91' in the housing 95. Member 91 turns about the arbor axis for purposes of adjustment of the blank in moving it to expose first one tooth surface and then another to the grinding wheel, and also in grinding. The presenting member 91 is turned by means of knurled head 92 at the left in Figure 2. This knurled head 92 has seated therein concentrically therewith a boss 93' formed on the head 93 of a clamping screw 94 which is threaded into the rear end of arbor 85 in an axial direction and serves to clamp the arbor 85 in and to the presenting member 91 and also to clamp the blank which is carried by the arbor to the presenting member 91. For the purpose of clamping the screw member 94 in fixed relation to the arbor 85, the head 92 is provided with a split portion 92'', and a take up or clamping screw 92', as shown particularly in Fig. 4 of the drawings.

The work presenting member 91 also includes an index plate 114 which is integral with member 91 and has notches or engaging points arcuately spaced about the arbor axis. These are selectively engaged by a spring controlled locking tooth or other engaging member 117 shown as carried by sliding bolt 118 which slides in the arm 98 and locks the arm 98 and its roller shaped end 99 to the index plate 114, and hence to presenting member 91. The bolt 118, and particularly the tooth 117, are normally advanced by a spring 119 which, as shown, is inside the bolt and abuts against a stationary cross pin 119', the bolt 118 being suitably slotted to provide for sliding relatively to pin 119'. The spring holds tooth 117 normally in engagement with one of the notches 115. The index plate 114 when released by withdrawing the pin 118 by means of knob 118' is rotated with the presenting member 91 by means of the knurled head 92 to give the desired angular position of the blank 12 about its axis.

The work presenting mechanism is mounted on way 120 integral with a plate 10'' mounted on the base 10' at the end of arm 10, being adjustably secured by screws 160 and 161 to correct for angularity as in Figures 23 and 30. The way engages a groove 123 in the base 121' of casing 95, and the alignment of the head or work supporting mechanism 11 is corrected and adjusted by means of screws 121 which bear against gib 122 in groove 123 which in turn bear against the side of way 120. The work presenting assembly 11 is adjusted toward and from the operator along ways 120 by screw 96.

The housing 95 for the presenting mechanism with the presenting member 91 therein which member 91 in turn carries arbor 85 and the blank 12 is mounted for adjustment along ways hereinafter described and at right angles to the axis of shaft 9 by means of a screw 96 having a knurled head 97 which is also shown in Figures 1 and 2. The presenting member or spindle 91 is provided as best shown in Figure 10 with a radial arm 98 which radiates from and rotates about the axis of the member 91 and has a roller shaped outer end 99, said roller shaped end being enclosed within a carrier 100 mounted on a sliding carriage 101 which slides transversely to the arbor axis in ways 102 in the casing head 103 which is attached to housing 95 of the work presenting mechanism 11. This carrier 101 is provided with a rack 104, Figure 10, which is engaged by a pinion 105 which pinion is carried on and operated by a shaft 106, Figure 2, which is parallel to the axis of the blank carrying arbor 85, and extends at right angles to the plane of Figure 1. This shaft 106 has a knurled head 107 which is clearly seen in elevation in Figures 1, 2, 4 and 10. The carrier 100 is also engaged by opposite stop screws 108 and 109, see particularly Figures 2 and 10. These screws as aforesaid are on opposite sides of the carrier 100 in the direction of the rack 104 and they are adjusted back and forth as desired to give the desired depth of grinding. Each screw 108, 109 is provided with a spring control to prevent undesired rotation. This consists of a hollow nut 110 for each screw, each nut being provided with an arm 111 which rests in a socket 112 in the casing 103. The screws 108 and 109 as hereinafter described, are adjusted to determine the depth of cut at each grinding stroke, and are held in adjusted position by the pressure of springs 111' within the hollow nuts 110.

Figure 14:
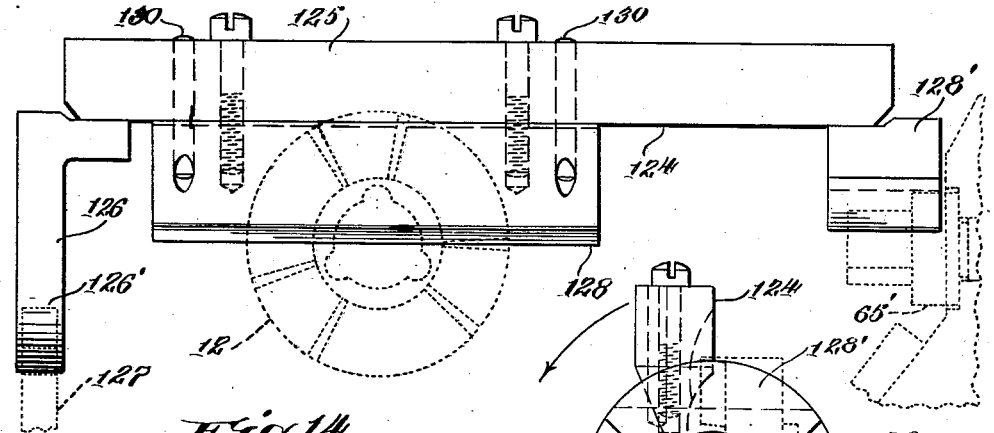
Figure 14 is an elevation of the gauge with the cooperating parts of the machine in broken lines, a blank being shown in broken lines in operative relation thereto.
Figure 15:
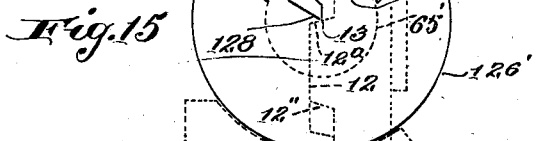
Figure 15 is an end elevation of the same looking from the right in Figure 14.

Figure 14 illustrates a gauge 124. This view may be called a front elevation as it is taken from the same direction as is Figure 1; Figure 15 being a view looking from the right in Figure 14. Cooperating portions of the machine in Figures 14 and 15 are shown in broken lines. The gauge comprises a bar 125 which, in the use of the gauge, is in a plane parallel to the plane of Figure 1. This bar 125 has at one end a circular depending disc 126, which is circular in a plane transverse to the length of bar 125. This disc is adapted to be seated in and to fit the support 127 as turned and adjusted as hereinafter described, the support being shown in Figures 1, 2, 14, and 15. The gauge 124 has at its opposite end a foot 128' which, as shown, has a circular concave surface 129 adapted to engage the head 65' of the clamping screw 65 in Figures 5, 14 and 15, the handle 67 being removable. The bar 125 is provided intermediately with a straight edge 128, shown in side view in Figure 14, and in end elevation in Figure 15, both being the operative position of the gauge in which the centers of the surfaces, 126' of disc 126 and 129 are in alignment, the surfaces being concentric and the straight edge 128 is aligned by means of dowel pin 130 with the axes of these two surfaces. In setting the machine, the straight edge 128 engages the radial line at the center of the tooth surface of the blank 12 which is to be first ground as indicated in Figures 14 and 15, the center being half way between the peak and the base of the tooth at 13, Figure 15, and it may be otherwise located.

The cutting or grinding surface 32 of the wheel 14 is trued by means of a diamond or a suitable cutter 131 shown in Figures 16 and 17, and also in the general view, Figure 1. In the construction shown, the diamond or cutter 131 is secured to a shank 132 which is in turn mounted in a carrier shaft 133 which is adjustably mounted in a clamping guide 134 which is slit at 135 in the direction of the shank 132, and the slit is closed by a screw 136 which is operated by an arm 137. The carrier shank 133 is shown as provided with a pin 138 which slides in the slit 135 as a way, and prevents the member 133 from rotating. The carrier 133, and the diamond cutter carried thereby are adjusted in the direction of the guide by means of a screw 139 operated by a thumb nut or other nut, 140 carried in a suitable slot in the guide 134. The diamond cutter is mounted on a base 141 which is secured to the table, i. e. the top of pedestal 143 by means of a screw bolt 142. The guide 134 is inclined as shown in Figures 16 and 17, to provide a suitable cutting angle in its engagement with the wheel 14 and particularly the grinding surface 32 thereof. The upper surface of pedestal 143 at 144 is finished in the plane of the top surface 144' of the pedestal 6, both planes being horizontal.

Cooperating with the diamond 131, I have shown a gauge indicated in a general way by reference character 145. The important feature of this gauge is that it has a downwardly disposed horizontal gauge surface 146 which, in the operative relation of the parts as shown, is in the same horizontal plane as the axis of the shaft 9. The gauge 145 as shown has a base 147 adapted to rest on the top surface 144 of the pedestal 143, and in this position, the preferred form of gauge shown, supports the gauge surface 146 in the plane above described, i. e. the horizontal plane of the axis of the shaft 9. This gauge surface 146 serves as illustrated in Figure 16, as a means for setting the diamond or cutter 131, so that it is adapted to finish the grinding surface 32 of the cutting or grinding wheel 14 so that its bottom or grinding element 32' as indicated in Figure 16 is in the horizontal plane of the axis of the shaft 9. As it rotates, the position of the bottom element or grinding plane of wheel 14 is of course maintained at all points, the wheel being circular about the axis of its shaft.

The construction already described provides for the adjustment of the diamond 131 into this gauge plane or cutting plane 146 and for clamping it in this position for operation as described.

The upright 25 which supports wheel or stone 14 being stationary, and the diamond point 131 being mounted on the table 2, to surface the wheel 14, the table is released by releasing the clamp 3, and is moved by rotating the hand wheels 4 and 5 to bring the diamond point in contact with the cutting surface 32 of the wheel 14 whereby this surface is cut so that its bottom element is in the horizontal plane of the axis of shaft 9 as already described. This is the grinding line hereinafter referred to. In this respect the dressing diamond 131 may be readily placed in fixed aligned position with the longitudinal axis of the grinding wheel 14 upon the table 2 being moved sufficiently to the right in Figure 1 of the drawings, whereby, the male portion 3'' of the socket clamp member 3 may be placed in registered engagement with the female portion of the socket clamp member 3'''.

Figure 17 shows the spacing plate 148 placed against the gauge surface 146 whereby the plane to which the diamond point 131 is adjusted is lowered below the plane of the axis of the shaft 9 by a predetermined distance. This provides for grinding the clutch blank with the tooth surfaces in a helix, the axis of which is spaced from the axis of the clutch member by a distance which may be half the width of the pin in the pin type of clutch illustrated in Figures 19 and 20. This operation will be more fully described.

Figure 11 shows the diamond point and its support with a mantel 149 to prevent the grit from coming in contact with the delicate bearings and other parts by which the diamond point is adjusted, and maintained in the desired position.

In the operation of the machine, the first step is to set the machine. Initially the table 2 is clamped by closing the clamp 3. In Figure 1 there is a gauge mark 150 on the casing 7. This gauge mark is also shown in Figure 5. In order to bring the center of the arbor 85 into the vertical plane of the axis of the wheel 14, an arbitrary method has been adopted. This consists in moving the shaft 9 by means of the lever 33 to a position in which the left hand edge 151 of the bange 58 is 5 inches from the gauge mark 150. This brings the axis of the blank and the arbor above mentioned which are identical into the vertical plane of the axis of wheel 14. The wheel 14 has already been set and trued by means of diamond point 131 so that the bottom cutting element 32' of the grinding surface 32 is horizontal and in the horizontal plane of the axis of shaft 9. In cutting a right hand helix, it is understood that the blank being cut at present is of the type in which the helical surfaces already described are radial, i. e. the axis of the helix is identical with the axis of the clutch and the surface ground is the power transmitting surface in right handed rotation of the clutch, and it is further understood that the clutch member or blank chosen for illustration is two inches in diameter having a one inch counter-bore in the center so that the radial length of each tooth is one-half of one inch. The presenting assembly 11 which is secured to the shaft 9 being on the arm 10, is now advanced one inch to the left as seen in Figure 1 which brings the outer radial end of the tooth to be ground into the vertical plane of the axis of the grinding wheel.

It should also be understood that part of the setting operation is to clamp the plate 52 in the position shown in Figure 8 with the groove 51 therein inclined in a northeast, southwest direction at an angle of 45° to the north and south line. The plan, Figure 8 being treated as a map, i. e. as having the corresponding points of the compass, and being viewed from the right in said Figure 8 which corresponds to the front of the machine as seen in Figure 1 it being understood that in applying this description the right side of Fig. 8 is to be treated as the bottom or south side of the map.

It is also understood that the blank 12 would be clamped to the mandrel or arbor 85 and the tooth surface 12ª to be ground would be set by means of gauge 124, Figures 14 and 15 with the central line of the tooth surface at 13, in Figure 15 in a horizontal plane, the center of the tooth surface which has first been roughed out to substantially the proper form being in contact with the knife edge 128 of the gauge which brings its center line 13 into line with the axis of the shaft 9, which in this machine is horizontal and sometimes referred to as the line of generation.

When the work support has been brought to the position above indicated with the radial outer end of the tooth 12 in the vertical plane of the axis of grinding wheel 14, the arm 10 is released by backing screw 65 by handle 67 and turned in left handed rotation as seen from the left in Figure 1 till the blank axis and the axis of arbor 85 are inclined at 20° to the axis of the arbor 85 in initial position in the vertical plane of wheel 14 which position of the arbor axis in the machine shown is horizontal. It is likewise true that in this position of the machine shown the grinding line 32' coincides with the arbor axis extended.

By turning the blank and arbor 20° as described, the blank 12 is rocked backwardly to the position shown in dotted lines in Figure 22 from the position shown in full lines in said figure. While this figure illustrates the grinding of the opposite surface of the tooth, the inclination is the same. This places the blank in the relation to the grinding wheel which it should occupy in the position of grinding or cutting the surface of the tooth at the outer radial end. The angle may be measured by vernier 63, 64. Next the arm 10 is clamped to shaft 9. The angle of the tooth at its outer end, as already explained, is 20° to the axis of the clutch member, the tooth being identified as 15° tooth, i. e. one having a 15° incline at a point half way between the radial ends of the tooth and 10° at its inner end. At this period of the operation, the index plate 114 is locked in the position shown in Figure 10. It may be considered that the stop screws 108 and 109 are as therein illustrated, and the blank and arbor are held in corresponding position.

In order to provide for the depth of the cut, the stop screw 109 is backed off by a distance which can be determined by the operator having a slight degree of familiarity with the machine. The lever 33 is then moved to the right in Figure 1 whereby the surface of the tooth is passed over the grinding wheel and it will be noted as the surface of the tooth passes over the grinding wheel the blank is rocked as illustrated in Figure 22, and in other figures, by means of the follower 50 operating in the slot or guide 51 as illustrated in Figures 6 and 8. After each passage of the blank over the grinding wheel the head 107 is rotated by the operator, rotating the shaft 106 and the pinion 105 moving the rack 104 whereby the blank is slightly rotated and fed to the cutter determining the thickness of each cut.

A refinement which is of importance has already been suggested in connection with Figure 25. As the blank is rocked through the positions Figures 23, 24, and 25, the base of the tooth at 156 moves away from the edge of the grinding wheel at 157, leaving a space indicated by reference character 158 between the stone and the base of the blank. To compensate for this motion the work support is slightly rotated in a horizontal plane as hereinafter described.

This is best illustrated in Figure 4. For this purpose, the bolts 160 and 161 are loosened, the work support indicated by reference character 11 in Figure 1, i. e., the work presenting assembly on the arm 10 is moved relatively to said arm by swinging it slightly about the bolt 160, this motion being provided for by the slot 162 in the base 10' in which the bolt 161 is located. This swings arbor 85 in the plane of its axis and the axis of shaft 9, the corrections being different for different cuts. The bolts 160 and 161 are then tightened and the grinding operation already described is carried on until metal to the desired depth of cut as determined by the stop 108 has been removed. The effect of swinging the work support 11 is illustrated in Figure 26.

When the depth of the cut has been determined to the satisfaction of the operator, and one surface 12ª has been generated by continuing the cutting until the radial arm roller carrier 100 contacts the adjusted stop 108, the initial surface being thus completed; each successive surface to be thereafter generated is brought to the grinding plane by releasing the index plate 114 by withdrawing the pin 118 and tooth 117, and turning the plate 114 and presenting member 91 by grasping the knurled head 92, see Figure 2, to a predetermined position in which the pin 118 being released by the operator the tooth 117 engages a predetermined notch 115. When this setting has been accomplished, the cut is completed by a series of strokes of the lever 33, the blank being advanced after each stroke by rotating the knurled head 107 in Figure 2 and hence the shaft 106, and thus moving the blank by way of the carrier 100 and radial arm roller portion 99 as already pointed out, it being understood that the blank is thus moved through and by way of the lever 98 and index head 114 which is attached to the rotary presenting member 91.

The faces, the grinding of which has been described, are the power transmitting surfaces in the right handed rotation of the clutch. When and if it is desired to grind the opposite faces of the teeth which is less essential unless the tools are to be frequently reversed, the disc 52 is unclamped and rotated to a position in which the guide slot 51 is inclined in a northwesterly and southeasterly direction as seen from the right in Figure 8 which corresponds to the front of the machine as seen in Figure 1, the previous cut having been made with the guide slot in a northeasterly and southwesterly direction as seen from the right in Figure 8 it being understood that Fig. 8 is to be treated as a map having its south or bottom end at the right in Fig. 8 as seen from the bottom of the sheet. The setting operation already described is reversed and the teeth are ground by the same operation already described which is believed to be easily understood in view of the previous description. The cutting of clutch members of the toothed variety for the type of clutch shown at 165 in Figure 19 has already been suggested. In this type of clutch, the operative surfaces of the teeth of helical arrangement are formed on an axis which is offset from the true axis of the clutch by a distance which corresponds to half the thickness of the pin 166. To effect this operation, the grinding wheel 14 is lowered, but it still keeps its grinding line 32', i. e., the lower portion of its grinding surface 32 in the vertical plane of the axis in a horizontal position. Figure 17 illustrates the gauge plate 148 which is of the proper thickness and is placed beneath and in contact with the horizontal gauge surface 146, the diamond point 131 is then adjusted into contact with the lower gauge surface 146' of the plate 148.

The carriage 2 is unclamped, and the diamond point 131 is by means of the operation of hand wheels 4 and 5 moving the table 2 suitably in a longitudinal direction, as hereinbefore described for purposes of fixing the diamond point 131 in aligned position with the longitudinal axis of the grinding wheel 14 by means of the clamping elements 3" and 3"', and thence in transverse directions passed over the cutting surface 32 of the wheel 14 to true the same in the desired plane.

The initial setting of the machine is the same as previously described, the table first being returned to cutting position and positioned and clamped by means of the clamp 3 which is adapted to both positioning and clamping of the table in the cutting or grinding operation. The main difference between this grinding operation and the one for the radial teeth aside from the setting of the wheel, is brought out in Figures 27 and 28 and 29. It may be assumed that with the cutting or grinding wheel 14 lowered with its cutting element below the center of the blank as would be essential to the adjustment already described, the blank in swinging from the initial to the 20° position as it is passed over the wheel, tends to bring the cutter into such relation with the blank that it would tend to cut below the base of the clutch member. Figure 27 shows a blank 165 in the initial upright position in which its axis is in the vertical plane of the axis of the wheel. Figure 28 shows the blank moved away from the wheel by turning the housing 95 and the entire presenting mechanism. This displacement avoids cutting into the base 167 of the blank between the teeth as already suggested. Figure 29 shows the relation of the cutting wheel to the blank in the 20° position when the outer radial end of the tooth is being ground and shows that the edge 157 of the wheel comes only to the base 167 at this time and does not cut into it. This adjustment is accomplished by loosening the nuts 160 and 161, Figures 2 and 4, and swinging the carriage or assembly 11 in Figure 1 to the left in Figure 4 instead of to the right to a degree sufficient to provide for the proper relation of the wheel to the blank as already explained. The nuts 160 and 161 are then tightened. The grinding of the tooth surfaces is then carried forward as already described in connection with the radial type of clutch member, i. e., the member having the tooth surfaces helically arranged on the axis of the clutch.

Figure 18 shows two clutch members having their tooth surfaces in helical form, the helix being formed about the axis of the clutch, the clutch members being 12 and 12", and substantially identical, Figures 21 and 22 show the helical type of clutch member, the full lines showing the clutch member in the position in which its axis is horizontal and in the vertical plane of the grinding wheel. This is not a cutting position for the blank, it being essential that the blank illustrated be moved one-half inch off center in the direction of arrow shown in Figure 21, before cutting takes place as to the left clutch tooth surface indicated at 12''' or in the opposite direction for cutting the tooth surface on the right of said clutch, thus it is necessary to move the blank as shown one-half inch off center before cutting takes place in either direction. The arrangement shown is for grinding the surfaces which engage in the left handed driving relation, i. e., the surfaces 12'''. In the operation, the blank is moved to the right from the center position. The dotted line position in Figure 22 shows the blank rocked through a 20° arc which corresponds to the end of the cut, the grinding wheel 14 engaging the outer radial end edge of the tooth surface at the one inch radius. Other sizes of teeth and other angles of helix may be cut. This operation is opposite to that first described, the angle of the blank at the time of cutting the outer radial end of the tooth is the same, but the surface being ground is at the left of the center of the arbor 85 in Figure 1, and the path of the blank is correspondingly different.

Figure 23 illustrates the cutting position in which blank has been turned through a 10° arc from the horizontal or from the 20° position and the cutter or grinding wheel is engaging the corner point or edge 170 of the tooth nearest the center as shown in Figure 21. Figure 24 shows the intermediate cutting position when blank has been rocked through a 15° arc, it being understood that the center of the tooth is inclined at a 15° angle to the axis. Figure 25 shows the position of the grinding wheel 14 when the blank has been rocked through a 20° arc without the final corrective adjustment about the bolt 160 as shown in Figure 4. Figure 26 shows the final cutting position for the outer edge of the tooth after this correction, the edge 152 of the wheel being in contact with the base of the tooth at 156. Figures 27, 28, and 29 already described, have relation to the offset tooth i. e. the type which cooperates with the pin 166, as illustrated in Figure 19. Figure 30 is a horizontal section on the axis of the clutch member, the angle 173 being the angle through which the blank is rocked by the adjustment at the bolts 160 and 161 to give the correct relation of the wheel 14 to the blank 12 as illustrated in Figure 26. The dotted line 174 shows what would be the path of the cut if the blank were not turned in this way. Figure 31 is a plan view of a two inch blank of the radial helical tooth surface type showing the dimensions of the blank, i. e. the figure being drawn twice actual size. The counterbore 175 is one inch in diameter, and the teeth 176 are one half an inch in radial length. The incline of the tooth surface 177 is illustrated and also the central line of this surface as described in connection with Figure 15 and indicated by reference character 13, is shown.

Figure 33 is an elevation of a tooth looking at right angles to the axis and showing the position of the blank with its axis in the vertical plane of the axis wheel 14. Said figure also shows at 179, the angle of the inner radial edge of the tooth, and at 181 it shows the angle of the surface at its outer edge. This is not a cutting position.

Figures 32, 34, 35, and 36 show the progress of the blank in its relation to the wheel as it is moved over the surface of the wheel. Figure 32 shows the blank with its axis in the vertical plane of the axis of the wheel, the view is looking at the front of the machine as in Figure 1, and from the left in Figure 33. In this position, the blank is being moved to the left by a corresponding motion of the lever 33, the tooth surface being indicated, reference character 177, as in Figure 31. Figure 34 shows the blank moved to a position in which the cutting element of the wheel indicated by 32' engages the inner radial end of the tooth indicated by 180 in Figure 31. In this position the blank has been turned through a 10° arc. Figure 35 illustrates a still further advance of the blank to the left in Figure 1, the blank at this time having been tipped through a 15° arc as illustrated in Figure 4. The cutting element 32' of the wheel 14 is in engagement with the center of the tooth surface where in the particular clutch disclosed the angle is 15° to the axis. Figure 36 shows the final cutting relation as the blank moves to a position in which the outer edge of the tooth surface, i. e., the outer edge in a radial direction indicated by 185 in Figure 31, is in contact with the cutting element 32' of the grinding wheel.

The machine is adapted to the cutting of various angles of teeth for clutches of different diameters, approximately 30° being regarded as the limit for clutches for the purpose herein described. The arrangement shown and particularly the details are capable of wide variation.

The invention may be treated as relating to the method of operation which is distinct from the machine as well as to the machine itself by which this operation may be performed.

The method may be further defined as consisting of the following steps in the production of clutch members for engagement in an axial direction, and having surfaces which are helical about an axis extending in the direction of the clutch axis; providing a blank having substantially helical tooth surface, grinding said surface by moving the blank along a path line which extends radially of the blank and through said surface for the radial length of the tooth and at the same time rocking it about said path in uniform relation to the line of motion through an angle equal to the change of angularity of the helix from the inner to the outer radial end of the tooth provided a grinding line substantially intersecting said path at right angles and thus contacting successive portions of the tooth with said grinding line which is so disposed that it would substantially coincide with the axis of the helix if the motion of the blank described be extended to the said intersection. While the blank is referred to as moving on a certain path, this is mainly for convenience of statement, the motion being essentially relative to give the result defined.

I have thus described a machine for grinding and generating clutch teeth or power transmitting surfaces and the method by which the same is accomplished; the description in this instance being specific and in detail as to structure in order that the manner of constructing, applying, operating, and using the invention may be fully understood; however, the specific terms herein are used in a descriptive rather than in a limiting sense, the scope of the invention being defined in the claims.

What I claim as new, and desire to secure by Letters Patent is:

1. The grinding method which comprises steps in the production from a suitable blank of a clutch member for engagement and disengagement in an axial direction, and having power transmitting clutch tooth surfaces ground in the form of a helix, the axis of the helix extending in the direction of the clutch axis as follows; moving the blank along a path line which extends radially of the blank and in the direction of said helical surface being ground, said motion extending throughout the radial length of the tooth, and at the same time rocking the blank about said radial path in proportion to the radial motion, the rocking motion extending through an arc equal to a predetermined change of angularity of the tooth surface from the inner to the outer radial end of the tooth, providing a grinding line substantially intersecting said radial path line at right angles, and thus contacting successive portions of the tooth with said grinding line, the latter being so disposed that it will coincide with the axis of the helix if the motion of the blank along said path be extended until the axis of the blank reaches said intersection.

2. The grinding method which comprises steps in the production from a suitable blank of a clutch member for engagement and disengagement in an axial direction, and having power transmitting clutch tooth surfaces ground in the form of a helix, the axis of the helix extending in the direction of the clutch axis substantially as follows; moving the blank along a path line which extends radially of the blank and in the direction of said helical surface being ground, said motion extending throughout the radial length of the tooth, and at the same time rocking the blank about said radial path in proportion to the radial motion, the rocking motion extending through an arc equal to a predetermined change of angularity of the tooth surface from the inner to the outer radial end of the tooth, providing a grinding line substantially intersecting said radial path line at right angles, and thus contacting successive zones of the tooth with said grinding line, the latter being so disposed that it will coincide with the axis of the helix if the motion of the blank along the path described be extended until the axis of the blank reaches said intersection, and further rotating said blank about its axis toward the grinding line to a predetermined extent to give the desired depth of cut.

3. The grinding method which comprises steps in the production from a suitable blank of a clutch member for engagement and disengagement in an axial direction, and having power transmitting clutch tooth surfaces ground in the form of a helix, the axis of the helix extending in the direction of the clutch axis as follows; moving the blank along a path line which extends radially of the blank and in the direction of said helical surface being ground, said motion extending throughout the radial length of the tooth, and at the same time rocking the blank about said radial path in proportion to the radial motion, the rocking motion extending through an arc equal to the predetermined change of angularity of the tooth surface from the inner to the outer radial end of the tooth, providing a grinding line substantially intersecting said radial path line at right angles, and thus contacting successive zones of the tooth with said grinding line, the latter being so disposed that it will coincide with the axis of the helix if the motion of the blank along the path described be extended until the axis of the blank reaches said intersection, and rocking the blank in a plane at right angles to the first mentioned rocking motion, and in the plane of said radius to correct deflection from the grinding line of the base of the tooth at the radial outer end of the tooth, said deflection being due to the first mentioned rocking motion.

4. The grinding method which comprises steps in the production from a suitable blank of a clutch member for engagement and disengagement in an axial direction, and having power transmitting clutch tooth surfaces ground in the form of a helix, the axis of the helix extending in the direction of the clutch axis as follows; moving the blank along the path line which extends radially of the blank and in the direction of said helical surface being ground, said motion extending throughout the radial length of the tooth, and at the same time rocking the blank about said radial path in proportion to the radial motion, the rocking extending through an arc equal to a predetermined change of angularity of the tooth surface from the inner to the outer radial end of the tooth, providing a grinding line substantially intersecting said radial path line at right angles, and thus contacting successive zones of the tooth surface with said grinding line, the latter being so disposed that it will coincide with the axis of the helix if the motion of the blank along the path described be extended until the axis of the blank reaches said intersection, and turning the blank about its axis through a predetermined angle to present the blank for the grinding of other power transmitting surfaces of the same helical contour.

5. The method of generating or grinding power transmitting surfaces of clutch members of the type which are adapted for engagement and disengagement in the direction of the clutch axis, the surfaces to be generated by grinding to be substantially helical about an axis extending in the direction of the clutch axis, which method consists in applying a rotating grinding member having a grinding surface, to a clutch blank member providing relative motion of said members on a path line in the direction of a radius of the clutch blank said path line being contained substantially in the surface being ground, and said grinding surface containing a grinding line which is intersected by said path line, and rocking one member relatively to the other about said radius proportionately to the radial motion whereby the grinding surface is passed over a corresponding surface of the blank in a plane of contact which is substantially helical in respect to an axis which extends through the blank in the direction of the clutch axis, said grinding line coinciding with the axis of the helix by prolongation of said motion bringing said latter axis to said intersection.

6. The method of grinding or generating the power transmitting tooth surfaces of a clutch member of the type which is adapted for engagement and disengagement in the direction of the axis of the clutch, said power transmitting surfaces being helical about an axis extending in the direction of the clutch axis, which method consists in applying a rotating grinding member to a clutch blank member to be ground, providing a grinding line in a tooth surface of the blank rocking the blank about a radius simultaneously with and proportionately to a radial motion of the blank, thus turning the blank through an angle equal to the predetermined difference in angularity between the inner and outer radial ends of the tooth, the grinding line substantially intersecting the said radius, and being disposed in the path of the axis of the helix.

7. In a machine for grinding the power-transmitting tooth surfaces of a clutch member of the type which is adapted for engagement and disengagement in the direction of the axis of the clutch, said power transmitting surfaces being substantially helical about an axis extending in the direction of the clutch axis, said machine having in combination a grinding member and means for rotating the same providing a grinding line, an arbor for holding the clutch member to be ground, means for moving the arbor on a path in line with a radius of the clutch blank, said radius lying substantially in the surface being ground, means for rocking the arbor and blank thereon substantially about said radius simultaneously with and proportionately to the radial motion of the blank, thus turning the blank through an angle equal to the predetermined difference in angularity between the inner and outer radial ends of the tooth, the grinding line substantially intersecting the said path and being in the path of the axis of the helix at said intersection, and means for angularly adjusting the arbor to correct for the deflection of the base of the tooth from the grinding member as the outer radial end of the tooth approaches the grinding line.

8. The method of grinding the power-transmitting tooth surfaces of a clutch member of the type which is adapted for engagement and disengagement in the direction of the axis of the clutch, said power transmitting surfaces being substantially helical about an axis extending in the direction of the clutch axis, which method consists in applying a rotating grinding member to a clutch blank member providing a grinding line of contact of the grinding member with the blank, moving the blank member substantially along the line of a radius of the same, said radius lying substantially in the surface being ground, rocking the blank substantially about said radial line simultaneously with and proportionately to the radial motion of the blank, thus turning it through an angle equal to the difference in angularity between the inner and outer radial ends of the tooth, the grinding line substantially intersecting the said path line and being substantially in the path of the axis of the helix, and turning the arbor and the blank thereon through predetermined angles about the arbor axis and holding the same in a plurality of respective positions angularly spaced about the axis of the arbor for the grinding of successive similar helical tooth surfaces.

9. In a method as per claim 8 rotatively feeding the blank about said latter axis toward the grinding member to a predetermined extent for each tooth surface to give the desired depth of the cut.

10. In a machine for generating and grinding helical power-transmitting tooth surfaces of clutch member of the type which release and engage in the direction of the clutch axis, said machine comprising an operating shaft, means for moving the same in the direction of its length and imparting thereto an angular motion about its axis in a predetermined variable proportion to its axial motion, a grinding member having a tooth grinding line of contact with the blank substantially at right angles to the axis of said shaft, means supporting a work presenting mechanism comprising an arbor on said shaft with the axis of the arbor intersecting the line of the axis of the shaft at right angles thereto, means for clamping said clutch member blank on said arbor with one of its power-transmitting blank helical surfaces substantially aligned with said axis in a radial direction of the blank, means for adjusting the grinding member to cause its grinding line to intersect the line of the axis of said shaft whereby the longitudinal and axial motion of the shaft sets up a relative motion between the clutch member and the grinding member, the grinding line being thus passed in a helical plane over a corresponding surface of the clutch member, and means for adjusting the grinding line to the angle of the tooth.

11. A machine as per claim 10 having means operable between successive movements of the shaft for rotating the arbor and clutch member thereon through a slight predetermined angle to determine depth of the cut, and means for holding the arbor and the blank thereon in a series of successive tooth grinding positions determined by rotation of the blank and the arbor about the axis of the latter whereby successive tooth surfaces are presented for grinding in similar form.

12. A machine as per claim 10 having means providing a series of adjusted positions of the work presenting mechanism and the arbor whereby it may be deflected substantially in the plane of its axis and the shaft axis to correct for the rocking of the blank away from the grinding member as the radial outer end of the tooth approaches the grinding line.

13. A machine for grinding the power transmitting surfaces of clutch members and similar surfaces comprising a shaft mounted to slide in the direction of its axis and having means for rotating the shaft about said axis in a predetermined angular relation to its axial motion, means for supporting a suitable blank on said shaft in the nature of an arbor carried by the shaft with its axis transverse to the shaft axis and substantially intersecting the axial line of the shaft, a grinding wheel mounted on a relatively stationary support having means whereby it is positioned with its grinding surface containing a grinding line in a plane transverse to the shaft axis, and substantially intersecting said latter axis, and with said grinding surface substantially tangent to said axis and in the path of the axis of said arbor.

14. A machine for grinding power transmitting surfaces and similar surfaces, comprising a shaft mounted to slide in the direction of its axis, and having means for rotating the shaft about said axis in a predetermined angular relation to its axial motion, means for supporting a blank on said shaft comprising bearings about which the blank may be rotated, the axis of said bearings being transverse to the shaft axis and substantially intersecting the axial line of the shaft, a grinding member mounted on a relatively stationary support and adapted to be positioned with its grinding surface containing a grinding line transverse to the shaft axis and substantially intersecting said axis, said grinding surface being substantially tangent to said latter axis, and said grinding line being in the path of the axis of said bearings.

15. A machine as per claim 13 having means for locating and holding the arbor in a series of positions having a predetermined angular relation to each other about the axis of the arbor whereby successive similar surfaces of the blank in predetermined angular relation to each other may be ground.

16. A machine as per claim 13 having means for holding the arbor in a series of positions having a predetermined angular relation about the axis of the arbor, and stop means cooperating with said holding means in each said position, and permitting turning the arbor a predetermined amount limited by the said stop means to determine the depth of cut.

17. A machine as per claim 13 having means providing for the turning of the blank and arbor through predetermined angles about their axis comprising a radially projecting arm rotative about the arbor axis, a member having engaging points arcuately spaced about the arbor and secured thereto, said arm having means operable to engage selectively the said points on said member, and external means for controlling the arm and the angularity of the blank about its axis.

18. A machine as per claim 13 having means for turning the arbor and the blank thereon through predetermined angles comprising a radial arm rotative about the arbor axis, a member having engaging points arcuately spaced about the arbor and secured to the arbor, said arm having means operable to selectively engage the said points connecting the arm to the arbor, and means for determining the depth of the cut comprising means in the path of said arm adjustable in the direction of said path to provide for limited feeding motion of the ground surface toward the grinding member.

19. In a machine as per claim 13 means for turning the arbor and the blank thereon through predetermined angles about their axis comprising an arm rotative about the arbor, a stationary member having engaging points arcuately spaced about the arbor, said arm having means operable to engage the points and means for determining the depth of cut comprising a carrier constrained to move on a path transverse to a radius of the arbor engaging said arm near its outer radial end, stop means for limiting the motion of the arm in cutting and means for moving said carrier toward said stop.

20. A machine as per claim 13 in which said sliding shaft has sliding and rotary bearings spaced in the direction of its length, the bearing nearest the arbor being split, and having adjusting means for opening said split and means for closing said split, and means for adjusting the position of the bearing, said adjustments serving to give the shaft the proper freedom for rotation, with a minimum of play, and to align the shaft.

21. A machine as per claim 13 in which the means for rotating the shaft comprises a follower carried by the shaft, and radially spaced therefrom, and a path member, the path being engaged by said follower and the path member being mounted for rotative adjustment about an axis transverse to the shaft, and having clamping means for holding it in adjusted position whereby the angle of rotation of the shaft, in proportion to its axial motion, is adjusted to determine the angle of the ground surface to the arbor axis.

22. A machine as per claim 13, the sliding and rotating shaft having an arm with a follower thereon, and means engaging the follower to provide said angular motion, the arm and shaft being formed for engagement of the arm with the shaft in diametrically opposite positions of the arm to permit the shaft to be turned over to compensate for eccentric wear of the same.

23. A machine as per claim 13 in which the said shaft also has carried thereby, on opposite sides of the arbor, gauge supports and a gauge cooperating therewith and having a gauge surface which, when the gauge is in cooperation with said supports, is substantially aligned with the axis of the shaft and substantially intersects the axial line of the arbor whereby the tooth surface initially ground is positioned.

24. A machine as per claim 14 having means for aligning and truing said grinding surface in accordance with said bearing axis.

25. A machine as per claim 13 in which said bearings are mounted for rocking adjustment substantially in the plane of the said intersecting axes and about said intersection to correct for the rocking of the blank away from the wheel.

26. A machine as per claim 13 having means providing for the location of the grinding surface whereby it projects slightly beyond the arbor axis to grind surfaces which are helical about an axis parallel to the arbor axis, but spaced therefrom.

ROBERT P. RENTZELL.